US012175552B2

(12) United States Patent
Haynes et al.

(10) Patent No.: US 12,175,552 B2
(45) Date of Patent: *Dec. 24, 2024

(54) WORKSITE SAFETY SYSTEMS, APPARATUSES, DEVICES AND METHODS

(71) Applicant: Stress Engineering Services, Inc., Mason, OH (US)

(72) Inventors: Clinton A. Haynes, Mason, OH (US); Daniel L. Morrow, Batavia, OH (US); Joseph Krumme Bullard, West Chester, OH (US); Shannon R. Read, Lebanon, OH (US)

(73) Assignee: Stress Engineering Services, Inc., Mason, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/598,387

(22) Filed: Mar. 7, 2024

(65) Prior Publication Data

US 2024/0212085 A1 Jun. 27, 2024

Related U.S. Application Data

(63) Continuation of application No. 18/221,041, filed on Jul. 12, 2023, now Pat. No. 11,954,751.

(60) Provisional application No. 63/400,154, filed on Aug. 23, 2022, provisional application No. 63/391,339, filed on Jul. 22, 2022, provisional application No. 63/388,666, filed on Jul. 13, 2022.

(51) Int. Cl.

| | |
|---|---|
| ***G06Q 40/08*** | (2012.01) |
| ***G06Q 10/06*** | (2023.01) |
| ***G06Q 10/10*** | (2023.01) |
| ***G06Q 50/26*** | (2012.01) |
| ***G08B 21/02*** | (2006.01) |

(52) U.S. Cl.

CPC ........... *G06Q 50/265* (2013.01); *G08B 21/02* (2013.01)

(58) Field of Classification Search

CPC .............................. G06Q 50/265; G08B 21/02

USPC .......................................... 705/1.1–912, 325

See application file for complete search history.

(56) References Cited

U.S. PATENT DOCUMENTS 11,164,134 B2 * 11/2021 Barak ................ G06Q 10/0635
2006/0032704 A1 * 2/2006 Chandra .................. E06C 7/18 182/18

(Continued)

*Primary Examiner* — Jonathan P Ouellette
(74) *Attorney, Agent, or Firm* — Frost Brown Todd LLP

(57) ABSTRACT

A workplace safety system includes an item of monitored equipment, a mobile communications device, and a scoring computing system. The item of monitored equipment includes a sensor, a transmitter, and a computing unit. The sensor is configured to generate signals. The computing unit is electrically coupled with each of the sensor and the transmitter. The mobile communications device is in wireless communication with the transmitter via a short-range communication protocol. The scoring computing system is in networked communication with the mobile communications device and is configured to receive data. The data includes an identity of an operator of the item of monitored equipment. A characteristic of operation is determined based upon the signals from the sensor and represents a manner by which the operator has used the item of monitored equipment. The scoring computing system is configured to generate a safety score associated with the operator. Methods are also provided.

20 Claims, 9 Drawing Sheets

(56) References Cited

U.S. PATENT DOCUMENTS

| | | | | |
|---|---|---|---|---|
| 2018/0033279 | A1* | 2/2018 | Chong | G06Q 10/0633 |
| 2020/0347674 | A1* | 11/2020 | Haynes | E06C 7/42 |
| 2022/0341263 | A1* | 10/2022 | Sakai | E06C 7/003 |

* cited by examiner

WORKSITE SAFETY SYSTEMS, APPARATUSES, DEVICES AND METHODS

REFERENCE TO RELATED APPLICATION

This application is a continuation of U.S. patent application Ser. No. 18/221,041 filed Jul. 12, 2023, which claims priority of U.S. provisional patent application Ser. No. 63/388,666 filed Jul. 13, 2022, Ser. No. 63/391,339 filed Jul. 22, 2022, and Ser. No. 63/400,154 filed Aug. 23, 2022, and hereby incorporates each of these patent applications by reference herein in its respective entirety.

TECHNICAL FIELD

The systems, apparatuses, devices and methods described herein can facilitate enhanced worksite safety.

BACKGROUND

Conventional worksites present hazards for workers, often involving items of equipment such as elevated working implements.

SUMMARY

In accordance with one embodiment, a method comprises detecting, with a sensor of an item of monitored equipment, use of the item of monitored equipment by an operator. The method further comprises wirelessly transmitting, via a short-range communication protocol, information associated with the use, as determined by the detecting, from the item of monitored equipment to a mobile communications device in possession of the operator. The method additionally comprises wirelessly transmitting data over a communications network, by the mobile communications device, to a scoring computing system. The data comprises an identity of the operator and a characteristic of operation. The characteristic of operation has been determined based upon the information and represents a manner by which the operator has used the item of monitored equipment. The method also comprises generating a score representing the operator's behavior for safety based upon the data.

In accordance with yet another embodiment, a workplace safety system comprises an item of monitored equipment and a scoring computing system. The item of monitored equipment comprises a sensor, a transmitter, and a computing unit. The sensor is configured to generate signals. The computing unit is electrically coupled with each of the sensor and the transmitter. The scoring computing system is in networked communication with the item of monitored equipment and is configured to receive data. The data reflects an identity of an operator of the item of monitored equipment. The data further reflects information concerning a manner by which the operator has used the item of monitored equipment. The information is at least partially based upon the signals. The scoring computing system is configured to determine a characteristic of operation of the item of monitored equipment based upon the information. The scoring computing system is further configured, based upon the characteristic of operation, to generate a safety score associated with the operator.

In accordance with another embodiment, a workplace safety system comprises an item of monitored equipment, a mobile communications device, and a scoring computing system. The item of monitored equipment comprises a sensor, a transmitter, and a computing unit. The sensor is configured to generate signals. The computing unit is electrically coupled with each of the sensor and the transmitter. The mobile communications device is in wireless communication with the transmitter via a short-range communication protocol. The scoring computing system is in networked communication with the mobile communications device and is configured to receive data. The data comprises an identity of an operator of the item of monitored equipment and a characteristic of operation. The characteristic of operation has been determined based upon the signals from the sensor and represents a manner by which the operator has used the item of monitored equipment. The scoring computing system is configured to generate a safety score associated with the operator based upon the data.

BRIEF DESCRIPTION OF THE DRAWINGS

It is believed that certain embodiments will be better understood from the following description taken in conjunction with the accompanying drawings in which.

DETAILED DESCRIPTION

Figure 1:
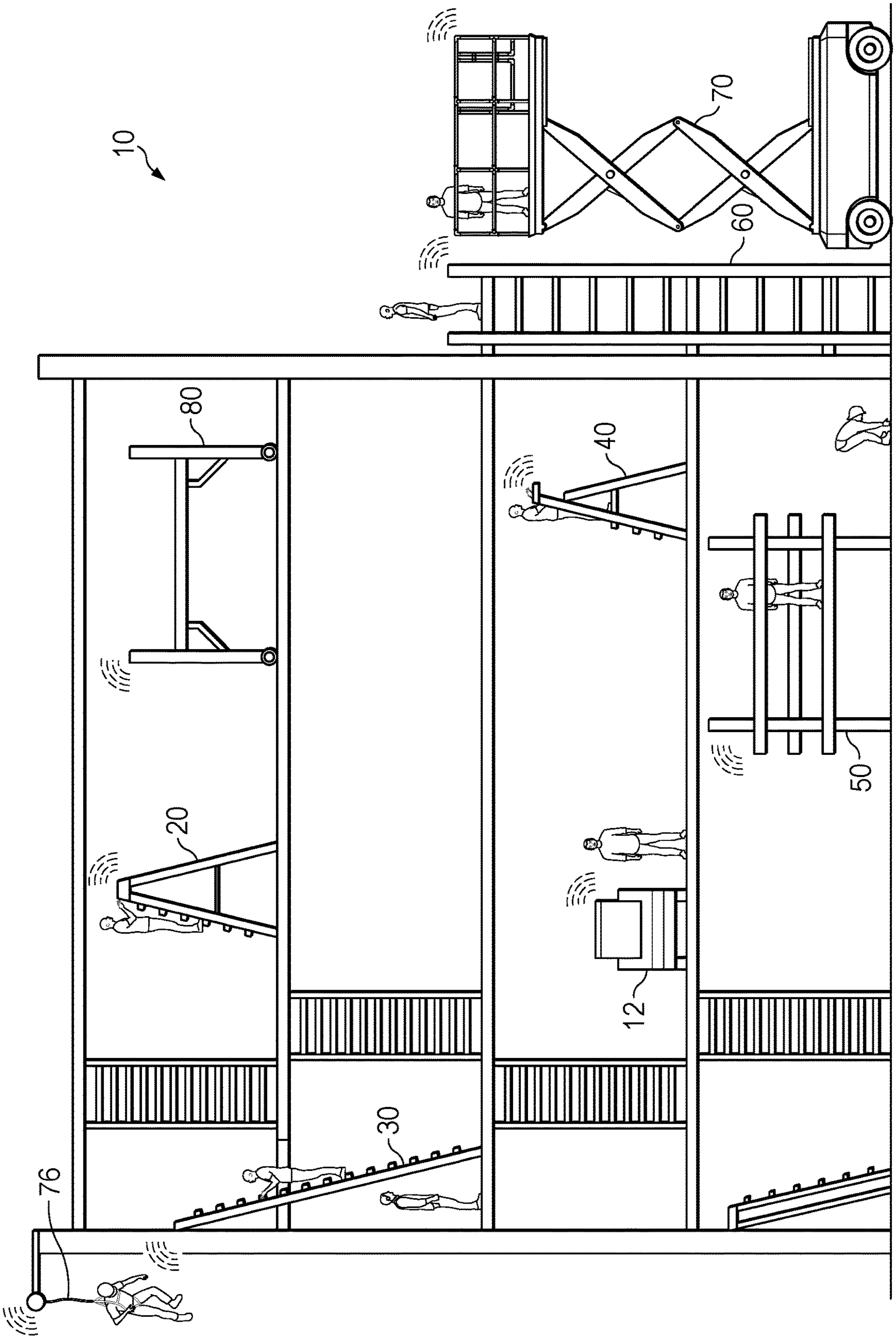
FIG. 1 is a schematic view depicting a worksite having multiple operators and items of monitored equipment in accordance with one embodiment.

Various non-limiting embodiments of the present disclosure will now be described to provide an overall understanding of the principles of the structure, function, and use of systems, apparatuses, devices, and methods disclosed. One or more examples of these non-limiting embodiments are illustrated in the selected examples disclosed and described with reference made to FIGS. 1-7 in the accompanying drawings, wherein like numbers indicate the same or corresponding elements throughout the views. Those of ordinary skill in the art will understand that systems, apparatuses, devices, and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

The examples discussed herein are examples only and are provided to assist in the explanation of the apparatuses, devices, systems and methods described herein. None of the features or components shown in the drawings or discussed below should be taken as mandatory for any specific implementation of any of these apparatuses, devices, systems or methods unless specifically designated as mandatory. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a series of steps or a flow diagram, it should be understood that unless otherwise specified or required by context, any explicit or implicit ordering of steps performed in the execution of a method does not imply that those steps must be performed in the order presented but instead may be performed in a different order or in parallel.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment, or "in an embodiment" in places throughout the specification are not necessarily all referring to the same embodiment. Furthermore, the particular features, structures or characteristics may be combined in any suitable manner in one or more embodiments.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and include a wide variety of electronic information, including executable code; content such as text, video data, and audio data, among others; and various codes or flags. The terms "information," "data," and "content" are sometimes used interchangeably when permitted by context. It should be noted that, although for clarity and to aid in understanding, some examples discussed herein might describe specific features or functions as part of a specific component or module, or as occurring at a specific layer of a computing device (for example, a hardware layer, operating system layer, or application layer), those features or functions may be implemented as part of a different component or module or operated at a different layer of a communication protocol stack. Those of ordinary skill in the art will recognize that the systems, apparatuses, devices, and methods described herein can be applied to, or easily modified for use with, other types of equipment, can use other arrangements of computing systems, and can use other protocols, or operate at other layers in communication protocol stacks, than are described.

As described in more detail below, the present disclosure generally relates to worksite safety systems, apparatuses, devices, and methods, selected embodiments of which are hereinafter described in connection with the views and examples of FIGS. 1-7. More particularly, as will be appreciated with reference to FIGS. 1-7, the worksite safety systems, apparatuses, devices, and methods can involve an ecosystem to facilitate safety of workers at a worksite. A worker is also referred to interchangeably herein as a user or an operator. In this ecosystem, one or more features can be continuously monitored at least during such time as one or more workers is/are actively working at a worksite. Through such monitoring, unsafe working conditions can be predicted and/or detected. Notifications can resultantly be provided to workers, supervisors and/or others in real time or near real time, with an objective of correcting the unsafe behavior before an injury results. Additionally or alternatively, record of such monitored conditions and/or notifications can be stored locally and/or remotely to facilitate long term determination of unsafe working trends or behaviors, to which subsequent training or other remediation can be provided to address.

Figure 2:
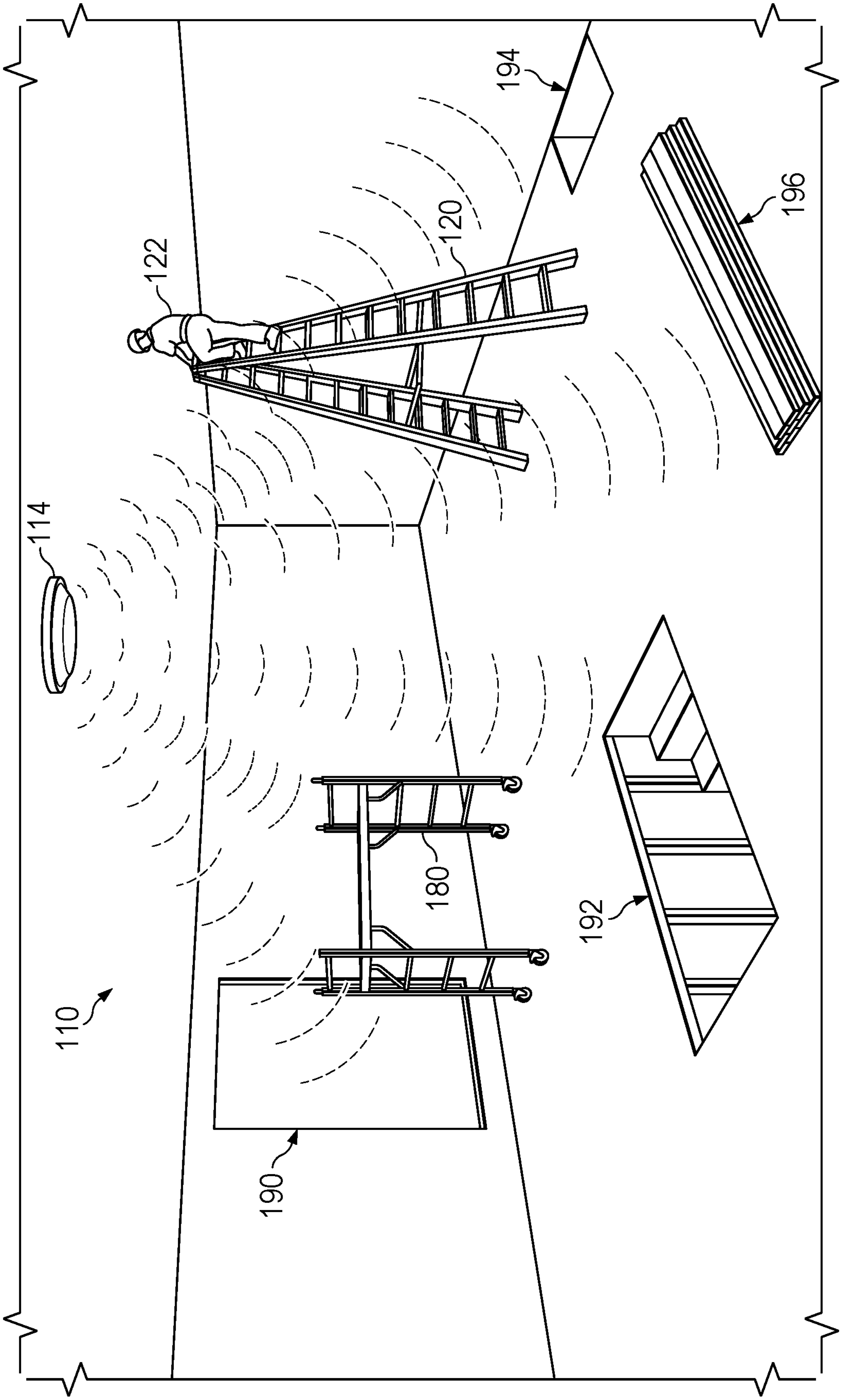
FIG. 2 is a perspective view depicting a worksite having an operator and items of monitored equipment in accordance with another embodiment.

FIG. 1 illustrates such an ecosystem provided at a worksite 10, and FIG. 2 illustrates such an ecosystem provided at a worksite 110. In accordance with one embodiment, within such an ecosystem, one type of equipment to be monitored is a step ladder, such as step ladder 20 shown in FIG. 1 and step ladder 120 shown in FIG. 2. The configuration, operation and associated monitoring of such a step ladder can be appreciated with reference to U.S. Pat. No. 11,499,370, the entire disclosure of which is hereby incorporated by reference herein in its entirety.

In accordance with another embodiment, within such an ecosystem, another type of equipment to be monitored is a scaffold, such as scaffolds 60 and 80 shown in FIG. 1 and scaffold 180 in FIG. 2. Scaffolds are available in several various types and configurations. For example, Baker/Perry type scaffolds (also referred to as Baker scaffolds) typically have a large deck surface (e.g., 3 ft.×6 ft.) and wheels/castors. For those situations where significant material supplies are required to do a job at elevation, more than one worker is needed to do the job at elevation, incremental mobility/relocation of the working deck with materials is needed to work efficiently to accomplish a job, more aggressive movements and strength are needed to accommodate the completion of the job, and/or significant time is needed to be spent at an elevated height, the deck of the Baker scaffold is often the work platform of choice.

Baker scaffolds are particularly useful when working at the interior of buildings, such as for accessing high ceilings or upper portions of walls, painting large ceiling areas where ladders would need to be repeatedly repositioned, and handling larger materials such as full sheets of drywall or long sections of ductwork. Baker scaffolds accordingly tend to be often used by masons, carpenters, tile and stone setters, cement and brick masons, concrete finishers, dry wall and ceiling installers, electricians, plumbers and pipefitters, insulation installers, painters, plasterers, HVAC/sheet metal workers, building maintenance personnel and construction helpers. Baker scaffolds are also useful for exterior work and general building maintenance.

Baker scaffolds differ in their use from ladders (step ladder or A-frame, extension, and platform ladders) in a number of ways. The user has significantly more freedom to move around on the deck of a Baker scaffold than they would have on a ladder. In addition, a Baker scaffold is designed for movement and for optimum stability and relies upon a level, smooth and firm ground surface for its four wheels/casters/feet to rest on. The user's ascent to the deck, whether via a ladder or otherwise, can present its own set of safety hazards and unique dynamics. Consequently, the Baker scaffold can be significantly unstable if it rests on an inappropriate surface, such as muddy or loose soil, and can present dangers to a user if the user's positioning and motions on the deck are not appropriately constrained, especially if the deck is placed at a substantial height relative to the ground surface, e.g., in a stacked version.

In addition, Baker scaffolds are frequently misused, such as when workers lift too much, lose balance, trip, lean too far, roll wheel(s) off an edge, fall off the deck, or assemble the unit improperly. Elevated risk of accidents has been attributed to such factors as increased fatigue as the workday continues, budget and schedule overruns, high frequency of disputes, contract changes and litigation, intense competition for work, poor performance evaluations, low profit margins and high insolvency risk, and the pressure to deliver projects quickly and with high quality. As a result, at any moment during use of a Baker scaffold, a worker can be at risk of falling and thus suffering a debilitating injury or death. While some workers are chronically careless, even the most responsible workers can fall or sustain other injury due to momentary lapse of judgement or mere accident.

Creating even more risk of injury, Baker scaffolds can be assembled and functional without all their components and safety features being installed or being installed correctly. This characteristic enables additional unintentional and intentional behaviors that can lead to accidents and injuries. Safe assembly and use of conventional Baker scaffolds is thus presently entirely at the discretion of the user.

Structure and operation of scaffold assemblies is herein described in reference to FIGS. 1-7. In accordance with the present disclosure, an integrated electronic safety monitoring system can be adapted to common Baker scaffolds with minimal change/alteration to the basic structure and operation of the Baker scaffold and can serve to provide an automated system that monitors, records and reports Baker scaffold loading and user actions that may produce unsafe conditions. A "smart Baker scaffold" can accordingly be provided. The technology described herein can provide building and maintenance contractors and other employers a powerful new tool to prevent scaffold accidents, as well as documentation of accidents that have occurred or been avoided. More particularly, the described technology can provide information on how Baker scaffolds are used and abused minute by minute, how workers behave before falls, and when accidents are narrowly missed. The gathered data can inform every aspect of Baker scaffold safety from training and supervision to designs and maintenance, and can result in improved worker safety behavior, reduced workplace injuries, and reduced insurance costs.

More particularly, disclosed herein are systems and methods for monitoring the use and behaviors of scaffolds such as Baker scaffolds, anticipating boundaries of stability that can lead to tip-over, monitoring conditions of use and misuse, alerting the user of the risky behaviors in an effort to prevent accidents and inform proper usage, reporting risky behavior to responsible managers, and warning emergency personnel if an accident condition is detected. These systems and methods retain the basic purpose of conventional Baker scaffolds but additionally embed the capability of preventing falls. Through effective implementation and use of this innovative technology, Baker scaffolds can be less prone to tipping, rolling off edges or into holes or being moved in inappropriate ways or at inappropriate velocities, resulting in reduction of fatalities and injuries resulting from falls. The systems and methods disclosed herein can accordingly facilitate monitoring, predicting and alerting of unsafe use, unsafe set-up and operation of Baker scaffolding in the construction trades and other uses.

Figure 3:
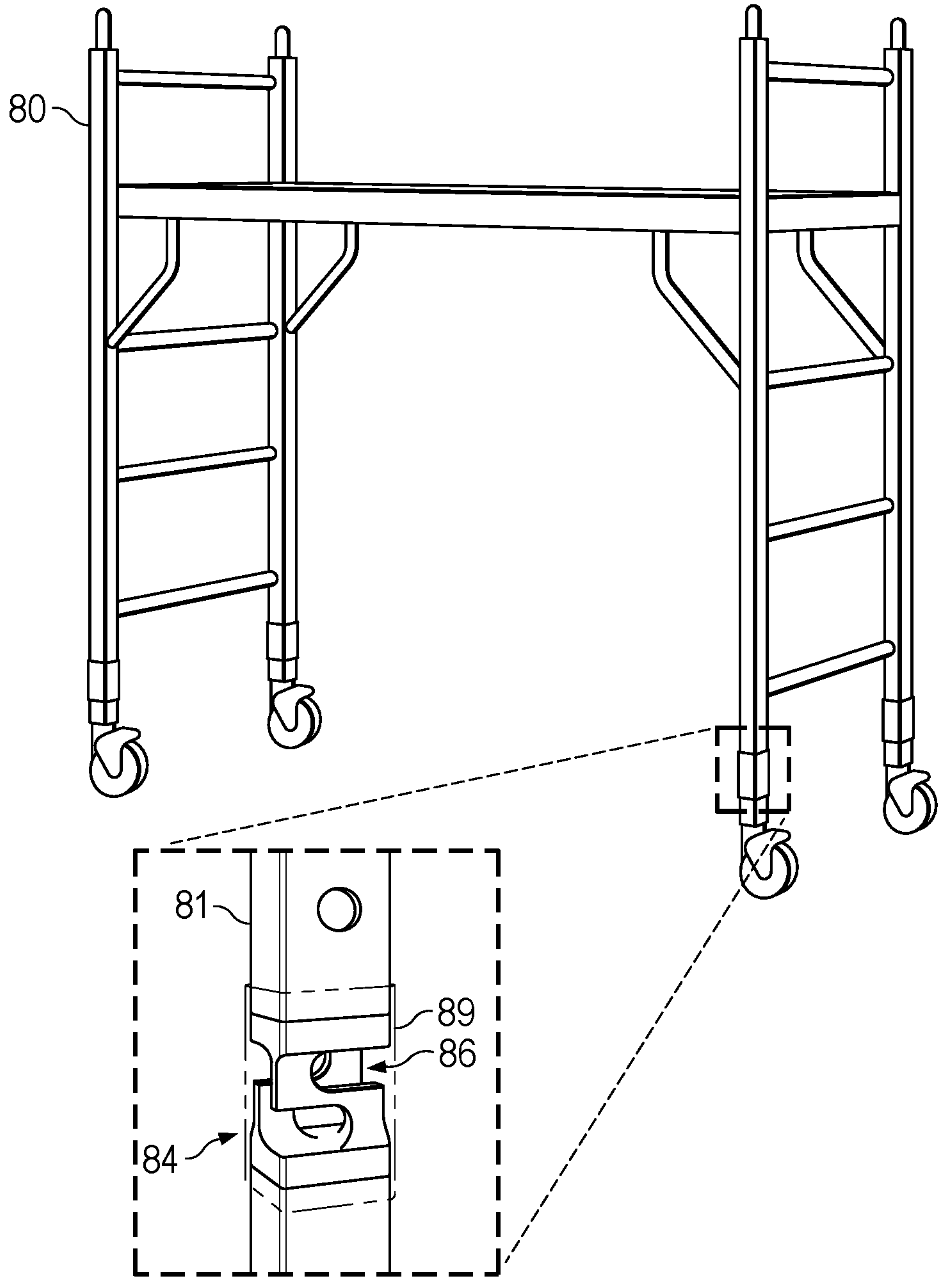
FIG. 3 is a perspective view depicting a scaffold assembly of FIG. 1, with a portion thereof including a transducer assembly being enlarged.
Figure 4:
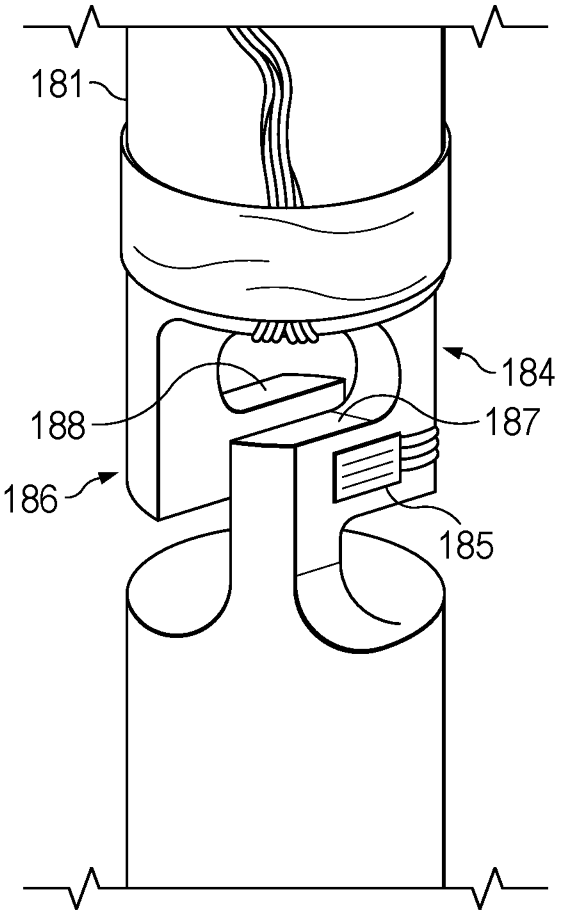
FIG. 4 is a perspective view depicting a portion of a scaffold system in accordance with another embodiment.

A smart Baker scaffold can include integrated low-powered, embedded electronics. For example, FIG. 3 illustrates a Baker scaffold having a sensor structure integrated into one of the four legs of the Baker scaffold. FIG. 4 illustrates an alternative embodiment of a sensor structure suitable for incorporation into the leg of a scaffold. While the sensor structure is shown with respect only to one leg, it will be appreciated that in alternative embodiments, more than one leg (or even all four legs) of a Baker scaffold can be fitted with a sensor structure. The sensor structure can be configured to detect the magnitude and direction of forces operating upon the associated leg. For example, a sensor structure can include a suitable mechanical configuration allowing for predetermined deflection under force along with one or more associated strain gauges, Hall effect sensors and/or other electronic transducers suitable to facilitate measurement of such force or deflection.

FIG. 3 illustrates a sensor arrangement 84 associated with one of the four legs (e.g., 81) of the scaffold 80, wherein a similar sensor arrangement can be associated with each of the other three respective legs of the scaffold 80. More particularly, the sensor arrangement 84 is shown to include a force transmissive structure 86 and a cover 89. The force transmissive structure 86 can include one or more sensors (not shown) to facilitate detection of force transmitted through the leg 81 of the scaffold 80. The cover 89 can be formed of a pliable material, for example, and can be applied over the force transmissive structure 86 to protect the force transmissive structure 86 from moisture, dirt and contact. The force transmissive structure 86 can be monitored with one or more sensors to reveal the nature of forces transmitted through the leg 81. It will be appreciated that a force transmissive structure of a sensor arrangement of a scaffold leg can have any of a variety of suitable configurations. The configuration and operation of the force transmissive structure 86 of FIG. 3 can be similar to that described with respect to an alternative force transmissive structure 186 shown in FIG. 4.

More particularly, in the example of FIG. 4, a sensor arrangement 184 is shown to be associated with a leg 181 of a scaffold, similar to the arrangement of FIG. 3, wherein a similar sensor arrangement can be associated with each of the other three respective legs of the scaffold. The sensor arrangement 184 can include a force transmissive structure 186 and a cover (not shown), similar to that described with respect to the sensor arrangement 84 of FIG. 3. The force transmissive structure 186 is shown to comprise first and second arms 187 and 188, with a strain gauge 185 applied to the first arm 187. It will be appreciated that force transmitted through the leg 181 can result in deflection of one or both of the first and second arms 187 and 188. The strain gauge 185 can detect any such deflection in the first arm 187. In one embodiment, a similar strain gauge (not shown) can be applied to the second arm 188 for detecting any such defection in the second arm 188. Upon processing of signals from the strain gauge(s) (e.g., 185), characteristics of forces passing through the leg 181 can be ascertained. In other embodiments, in lieu of strain gauges, it will be appreciated that one or more sensors employed on a Baker scaffold can employ one or more Hall effect sensors such as of a type described in U.S. Pat. Nos. 11,486,772, 11,536,782, and 11,635,307, the entire disclosures of which are hereby incorporated by reference herein in their entireties. A sensor structure associated with a leg or other portion of a Baker scaffold can alternatively or additionally include an accelerometer, an inclinometer, and/or any of a variety of other suitable measurement devices. It will further be appreciated that a Baker scaffold can include any of a variety of other suitable sensors that may or may not be associated with a leg thereof. For example, one or more sensors can be associated with a deck, wheels, rails, pins or other components of the Baker scaffold.

A sensor can either be provided as an integral part of a scaffold component, or instead can be provided as an auxiliary component which is suitable for selective attachment to a scaffold component. A Baker scaffold typically has a kit-style design which can be assembled by a user from components at a job site. Sensors and/or other features of the present monitoring system can be integrated into one or more of those components of the kit-style design. As scaffolds are conventionally provided as a kit of parts (e.g., wheels, legs, deck, pins), it will be appreciated that implementation of a smart Baker scaffold can be accomplished either by adding some additional parts (e.g., sensor units) to the conventional kit, or replacing some of the conventional parts of the conventional kit with new parts (i.e., including sensors). The number, type and location of sensors can be selected based upon the type and configuration of the scaffold to be monitored, the type of data desired to be collected, and the type of alerting that is desired to the user.

It will be appreciated that the sensors and other electronics can be integrated into a Baker scaffold in a small, reliable and cost-effective way. Sensing and instrumentation can be configured to collect information related to the scaffold stability, user behaviors, etc. In one embodiment, priorities for sensors and electronics integration can involve components that are deemed to be critical-to-function and critical-to-safe-use of a Baker scaffold. In one embodiment, the sensors and other electronics can be configured to detect whether: spring pins that secure the deck supports onto the scaffolding uprights are fully engaged; outriggers are required and/or are present for stability, particularly when the scaffold is more than one unit high; scaffold deck railings are installed; the scaffold remains stable when being climbed; primary scaffolding segments are adequately engaged; wheels are adequately secured in scaffold frame tube (e.g., wheel locking pins are appropriately secured); and/or wheel brakes are engaged.

As one example, force transducers can be provided to monitor load distribution at the base of the Baker scaffold (e.g., see FIG. 4) where in-use conditions can greatly affect the boundaries of stable scaffolding operation, such as stability, based on user position and activity, load distribution/redistribution, tip-over, and rolling surface characteristics. Velocity sensors (e.g., inertia measurement unit) can be associated with and/or integrated into the wheels, and/or position detection circuitry (e.g., global positioning system or GPS) can be provided, to facilitate assessment of the rate and direction of movement as well as stability of the Baker scaffold. Other types and configurations of sensors can also or alternatively be provided.

It will be appreciated that sensors and electronics integrated into a Baker scaffold can be configured to have low energy requirements and/or constant or variable sampling rates to facilitate desired monitoring and warnings while preserving battery life. The sensors and other electronics can be configured to minimize battery power consumption for sensing, computation, and data communication. In one embodiment, energy harvesting can be provided such as by incorporating a vibration energy harvesting system onto the frame of the scaffold and/or by incorporating a roller energy harvesting system into the wheels of the scaffold or by harvesting energy from deck deformation. Such systems can convert the energy from vibration, displacement and/or the rotational kinetic energy into electrical energy to recharge batteries or capacitors of sensors and other electronics installed on the scaffold. Piezoelectric or induction-based energy capture or conversion technologies can additionally or alternatively be employed. In other embodiments, such sensors or electronics can include replaceable batteries.

Unlike ladders, where manufacturing volumes for professional and consumer markets have led to an industry structure where there are several large dominant players, Baker scaffolding volumes are much lower because they are primarily limited to professional users. As a result, there is no clear market dominance and imports of off brands/knock-offs can be common. Fortunately, the design of the scaffolding structures is relatively simple and relatively little variation exists between designs, making them ideal candidates for a "safety kit" model for integration of smart technology as described herein. Baker scaffolding can be designed as a geometrically regular structure (a frame structure forming a rectangle with a deck of adjustable height) with wheels/castors at the four corners. Although the structure might be considered simpler than the complexity of other work-at-height options like ladders, the assembly conditions can nevertheless be considered by the safety monitoring system. Examples of such assembly conditions can include scaffold loading and load distribution, velocity and direction of movement, movement tracking, wheel security (lock/unlock), deck position and locking mechanism security, number of decks, total assembled height and stacking of the scaffolding, presence or absence of outriggers, presence or absence of deck railings/guards, and rolling surface characteristics.

Regardless of the type and quantity of sensors on a Baker scaffold, it will be appreciated that each of them can be provided in communication with a computing unit. Some or all of the sensors can be wired to the computing unit, though in other embodiments some or all of the sensors can be wirelessly coupled with the computing unit. The computing unit can be provided with an awareness of the assembly-related status/set-up of a Baker scaffold, either through programming or otherwise, to facilitate its effective discernment of scaffold operation. By monitoring feedback from the sensors, the computing unit can assess status of operation of the Baker scaffold and can then provide or facilitate provision of alerts to users and possibly others. For example, the electronics can communicate via any of a variety of suitable pathways such as Bluetooth for local communication of warnings, as well as existing and emerging cellular communication modalities for communication to data aggregation and storage facilities and notification of emergency and responsible authorities.

In one embodiment, the computing unit can comprise a smartphone. Smartphones, already in use by virtually all construction workers, can be wirelessly coupled with the system of sensors and communication electronics on Baker scaffolds to promptly detect and issue alerts of risky conditions and worker behavior. In addition to providing alerts to a user, a smartphone can transmit data to a backend server where the data can later be reviewed by the user, supervisors, scaffold manufacturers, insurance companies, and others, both on an individualized basis and in aggregation with other data. Wireless communication technologies can be employed to transmit signals from a scaffold in its usage environment, directly or through a smartphone, to a responsible emergency response authority in case of an accident and/or to infinitely scalable repository services for anonymous, aggregated data storage for further analysis and extraction of actionable insights. For example, in one embodiment, the wireless communication can involve use of Bluetooth for communication of data between scaffold-mounted sensors and electronics with a smartphone, and the smartphone can then use cellular-enabled, satellite, LoRa, or Wi-Fi communications to facilitate transmission of that data remotely from the worksite, such as to emergency and responsible personnel.

By employing a smartphone as part of a smart Baker scaffold system and method, it will be appreciated that use of the system and method by a user can be simple and inexpensive, and is thus likely to be more readily adopted and used in the field. Implementation of this technology can accordingly be relatively inexpensive and need not require large investments in purchasing or learning operation of new equipment by end users. It will be appreciated, however, that in other embodiments, scaffold-mounted electronics can incorporate cellular-enabled, satellite, LoRa or Wi-Fi communications capabilities for directly transmitting data remotely from the worksite, such as to emergency and responsible personnel.

A warning, such as by a smartphone or provided directly by electronics integrated into the scaffold (e.g., lights, displays, audible indicators, and/or vibrators), can effectively communicate the presence of danger to the user and guide the user to produce the desired behavioral outcome. For example, the success of the warning can be influenced by a myriad of perceptual factors including the modality, intensity, and the temporal structure of the signal, contextual factors including noise and potential distractors in the environment, as well as cognitive factors such as load and other constraints produced by the working task demands. The warning signal can accordingly reliably alert workers to the possibility of an impending fall, thereby reducing the likelihood of accidents across a myriad of contexts and working environments. Visual, auditory and/or tactile feedback signals can accordingly be provided. It will be appreciated that multimodal warnings (i.e., delivered via multiple perceptual channels) can be more readily detected, elicit greater compliance, elicit faster response times and fewer false responses than warnings delivered through any single modality alone. However, because multimodal warnings may demand active monitoring across several perceptual sensory channels, they may induce increased subjective workload and perhaps may produce startle responses from the user, both of which can prove overly distracting for a worker engaged in some activity while balancing on a scaffold. The mode and type of warning signal(s) can be selected to achieve maximum effectiveness of reducing risk and promoting worker compliance to safe behaviors.

FIGS. 5A-5F illustrate several operational scenarios of a scaffold system which can be detectable by a monitoring system in accordance with one embodiment. Examples of such detectable conditions can include, for example, exceeding of maximum load capability, unbalance of loading, instability, excessive movement speed, movement while occupied, falling of the operator, inappropriate climbing of side structure, irregular rolling surface, and jam/lock-up of the wheel(s). It will be appreciated that any of a variety of additional or alternative working conditions and/or behavior can also be detected. The systems and methods described herein can be particularly effective because, for various suitable implementations thereof, many, most or all relevant load-paths of a Baker scaffold can be monitored and measured. As such, all relevant static and dynamic loadings and disturbances of a Baker scaffold can be observable through consideration of the appropriate physics, appropriate monitoring of the Baker scaffold, and application of suitable analytics.

The smart Baker scaffold system and method can accordingly have capability to detect and differentiate among risky behaviors on Baker scaffolds (e.g., see examples in FIGS. 5A-5F), and then alert workers before falls occur, in ways that do not distract workers and cause greater risk. Data can then be provided to a backend analytics platform so that near accidents can be identified, accidents can be reconstructed, and an accident prevention dashboard can be presented for use by construction managers to prevent future accidents. For example, such data can be useful to improve safety training, supervision, scaffold design, and maintenance. In this way, the smart Baker scaffold system and method can help prevent injuries, deaths, and financial losses. When combined with other data streams including work schedules, weather, traffic, etc., analysis in accordance with the present disclosure can reveal or predict deteriorating scaffold safety behavior such as when work falls behind schedule, fatigue is predicted based upon length of the workday or hours worked during workday(s), etc.

In one embodiment, a sensor-based alarming system (i.e., alarming when sensor readings exceed a pre-defined alarm threshold, such as an over-loading condition) can be implemented in edge electronics located on the scaffold and can be configured for wireless communication with a smartphone, artificial intelligence (AI) computation, alarm triggering, and powering of low-energy sensors. A smartphone app can communicate with edge electronics and generate alarms to alert workers to potential hazards.

It will be appreciated that foundational analytics can be employed for detecting primary use/misuse behaviors of the Baker scaffold, based upon signals received from the sensors and electronics, and further based upon prior modeling and AI/machine learning ("ML"). In one embodiment, edge computing can be provided on the Baker scaffold structure, wherein sufficient local computational power can promptly interpret conditions or actions of the Baker scaffold (using analytical and stochastic models and/or AI), and can facilitate alerting of workers in real time or near real time of unsafe setup or usage of the Baker scaffold, or progressing toward an unsafe condition. In one embodiment, ML can be used as a form of AI to aid in data interpretation, beyond what can be characterized via closed-form analytics. Closed-form analytical models can describe the load-carrying characteristics of a Baker scaffold for a range of configurations (platform height, stacked scaffolds, etc.). In addition to functional models, at all as-designed setup conditions, analytical solutions can also support surface conditions that are non-ideal. Physics-based analytical models can accordingly be used as part of a scaffold's on-board analytics and can facilitate effective monitoring of the scaffold's setup configurations and support surface characteristics, both of which can be important to enable safe use of the scaffold.

Predictive non-linear computational models can employ explicit dynamics finite element methods. These models can account for factors such as base stability, scaffold configurations, and user behaviors on a scaffold's impact stability. Setup conditions, such as those with potential to upset scaffold equilibrium and result in a platform moving or tipping and a worker falling, can also be accounted for in recognizing or predicting scaffold instability.

AI/ML analytics can be employed to perform onboard computations and/or alarm unsafe conditions of a Baker scaffold that cannot be effectively captured by simple sensor-based or threshold-based diagnostics or alarms, or as conditions are considered to trend toward being unsafe. The AI/ML analytics can retain knowledge from computational models and closed-form analytical models while significantly improving computation efficiency. Data from a human-in-the-loop engineering study can be collected for AI/ML algorithm training, and simulation data from computational models and closed-form analytical models can be used to generate data for falling incidents or other dangerous situations. Scaffold assemblies, systems and methods as described herein can include one or more of the features and functionalities described in U.S. Pat. No. 11,499,370, the entire disclosure of which is hereby incorporated by reference herein in its entirety.

While step ladders and scaffolds are examples of elevated working implements, in still further embodiments, within an ecosystem, other type of elevated working implements can additionally or alternatively be monitored such as, for example, straight or extension ladders such as extension ladder 30 as shown in FIG. 1, platform ladders such as platform ladder 40 in FIG. 1, safety harnesses such as safety harness 76 in FIG. 1, aerial work platforms such as scissor lift 70 in FIG. 1, and pump jacks such as with raised walkboards 50 in FIG. 1. It will be appreciated that each of these items of equipment can include electronics configured to monitor operation and facilitate reporting of unsafe operation or working conditions, in a fashion such as can be similar to that which has been described with reference concerning step ladders and scaffolds.

In the case of a platform ladder (e.g., 40 in FIG. 1), also referred to as a podium ladder, it will be appreciated that sensors and electronics can be provided to monitor various operational characteristics of the platform ladder. Such operational characteristics can include, for example, to what extent the platform ladder is set up, namely whether the platform ladder is fully deployed or only partially deployed from its folded storage position. Manner of contact of the platform ladder with a ground surface can also be monitored, thereby revealing whether the platform ladder rests upon an even surface with contact of all four feet therewith. A user's behavior upon the platform ladder can also be monitored to ensure safe operating conditions such as stability within an acceptable envelope, center of gravity within an acceptable location, contact of individual feet of the platform ladder with the ground, and appropriate weight distribution among the legs of the platform ladder. Sliding of the feet of the platform ladder upon the ground surface can also be determined. Through dynamic load monitoring, such as in this manner, the electronics can determine if an operator is misusing (e.g., improper leaning) or has fallen from the platform ladder. It will be appreciated that these and other characteristics can be determined through use of sensors provided as part of the platform ladder, such as in each of the individual feet of the platform ladder (e.g., in at least some respects similar to the manner disclosed herein with respect to a step ladder). In some embodiments, the identity of the operator can also be monitored and determined by the platform ladder or associated electronics (e.g., a smartphone), such as to facilitate reporting of the operator's specific manner of behavior involving the platform ladder.

In the case of an extension ladder (e.g., 30 in FIG. 1), it will be appreciated that sensors and electronics can be provided to monitor various operational characteristics of the extension ladder. Such operational characteristics can include, for example, to what extent the extension ladder is set up, such as angle of inclination, deployment of feet, and length of extension. Manner of contact of the extension ladder with a ground surface can also be monitored, thereby revealing whether the extension ladder rests upon an even surface with contact of both feet therewith. A user's behavior upon the extension ladder can also be monitored to ensure safe operating conditions such as stability within an acceptable envelope, center of gravity within an acceptable location, contact of individual feet of the extension ladder with the ground, and appropriate weight distribution among the legs of the extension ladder. Sliding of the feet of the extension ladder upon the ground surface can also be determined. Through dynamic load monitoring, such as in this manner, the electronics can determine if an operator is misusing (e.g., improper leaning) or has fallen from the extension ladder. It will be appreciated that these and other characteristics can be determined through use of sensors provided as part of the extension ladder, such as in each of the individual feet of the extension ladder (e.g., in at least some respects similar to the manner disclosed herein with respect to a step ladder). In some embodiments, the identity of the operator can also be monitored and determined by the extension ladder or associated electronics, such as to facilitate reporting of the operator's specific manner of behavior involving the extension ladder.

In the case of a safety harness (e.g., 76 in FIG. 1), which can include both a hoist and a harness assembly, it will be appreciated that sensors and electronics can be provided to monitor various operational characteristics thereof. Such operational characteristics can include, for example, user identification, temperature and/or moisture detection, elevation, location, weight suspended, velocity of descent or ascent, status of hook closure, and status of tethering. By monitoring such characteristics of the safety harness, the electronics can determine if a fall has occurred. Upon such determination, alerts can be provided to one or more of a supervisor, other workers in the vicinity, local emergency medical services, and/or off-site management. Further upon such determination, data can be captured and recorded concerning the parameters of the fall including, for example, one or more of the associated time, date, location, user identification, fall velocity, fall stop force, suspended weight prior to the fall, workers in the vicinity (e.g., possible witnesses), whether a fall arrestor was used or misused, whether a hook is closed, whether the worker is tethered, and what other recognized equipment is in the vicinity. Even absent a fall, it will be appreciated that these and other characteristics can be determined through use of sensors provided as part of the safety harness. In some embodiments, by monitoring and determining the identity of the operator (e.g., with a smartphone), the operator's specific manner of behavior involving the safety harness can be recorded and evaluated.

In the case of pump jacks with raised walkboards (e.g., 50 in FIG. 1), it will be appreciated that sensors and electronics can be provided to monitor various operational characteristics thereof. Such operational characteristics can include, for example, amount of loading relative to maximum allowable loading, manner and relative allocation of loading between the pump jacks, and stability of attachment of the pump jacks (to the raised walkboards, ground surface and/or wall structure). A user's behavior can also be monitored to ensure safe operating conditions such as stability within an acceptable envelope and center of gravity within an acceptable location. Through dynamic load monitoring such as in this manner, the electronics can determine if an operator is misusing (e.g., improper leaning) or has fallen from a raised walkboard with attached pump jacks. It will be appreciated that these and other characteristics can be determined through use of sensors provided as part of the pump jacks and/or raised walkboards. In some embodiments, the identity of the operator can also be monitored and determined (e.g., by a smartphone), such as to facilitate reporting of the operator's specific manner of behavior involving the pump jacks with raised walkboards.

In the case of an aerial work platform (e.g., the scissor lift 70 of FIG. 1), it will be appreciated that sensors and electronics can be provided to monitor various operational characteristics thereof. Such operational characteristics can include, for example, amount of loading relative to maximum allowable loading, dynamic load monitoring during use, speed and duration of use, monitoring of instability boundaries, detection of deployment of outriggers, monitoring of rolling surface characteristics (e.g., rough surface or wheel obstruction), and ground surface slope. A user's behavior can also be monitored to ensure safe operating conditions such as stability within an acceptable envelope and center of gravity within an acceptable location. Electrical and mechanical systems of the aerial work platform can also be monitored independently or through an interface to an electronic control module or other system(s) present on the aerial work platform. Through such monitoring, the electronics can determine if an operator is misusing (e.g., improper leaning) or has fallen from an aerial work platform. In some embodiments, the identity of the operator can be monitored and determined (e.g., by a smartphone), such as to facilitate reporting of the operator's specific manner of behavior involving the aerial work platform.

In one embodiment, monitored equipment present within a worksite (e.g., ladders, scaffolds, safety harnesses) can be configured to communicate data directly with one or more nearby smartphones (e.g., via Bluetooth) such as may be carried by the individual workers. In such an arrangement, the smartphones can be provided with an app or other software which facilitates provision of notifications to the user (e.g., in real time of unsafe working conditions) and/or transmission of data to a remote destination. In another embodiment, monitored equipment present within a worksite (e.g., ladders, scaffolds, safety harnesses) can be configured to communicate data directly with a dedicated communication hub, which itself may then communicate data directly with one or more nearby smartphones (e.g., via Bluetooth) such as may be carried by the individual workers, and/or directly (e.g., via cellular, satellite, LoRa or Wi-Fi) to a remote destination (e.g., a supervisor, data center, or emergency services organization).

In one embodiment, a dedicated communication hub can be provided within or integrally with a job box 12, as shown for example in FIG. 1. In another embodiment, a dedicated communication hub 114 can be attached to a ceiling, wall or other structure provided at a worksite, as shown for example in FIG. 2. However, in other embodiments, it will be appreciated that a dedicated communication hub can be integrated into a ladder, scaffold or other equipment present at a worksite. When provided within a job box (e.g., 12), a dedicated communication hub can additionally serve to monitor location of the job box, environmental conditions of the job box, opening and closing of the job box, insertion and removal of specific tools to and from the job box, and other activities and parameters associated with the job box. It will be appreciated that use of a dedicated communication hub can facilitate viewing and monitoring of associated on-site equipment as a related group rather than as individual elements, thereby providing an efficient and wholistic perspective of the worksite.

When integrated into a job box, it will be appreciated that a dedicated communication hub can additionally be configured to monitor the occasion and timing of opening and closing of the job box, as well as to identify operators in the vicinity of the job box, items placed within or removed from the job box, and the location of the job box. Awareness of such monitoring can help deter undesired moving of the job box to an unauthorized location and/or taking items from the job box without authorization. If a job box is so moved or items are so taken, such monitoring can help to facilitate subsequent location thereof and/or identification of such operators. The dedicated communication hub can also monitor internal temperature of the job box to ensure suitable conditions for items stored therein. A dedicated communication hub can additionally or alternatively monitor other ambient environmental conditions such as temperature, vibration, humidity, light, and noise, for example to verify suitability for operators working at a worksite.

A dedicated communication hub (e.g., 114 in FIG. 2) can be configured to inventory and account for the proper and improper use of each of the monitored equipment within an associated worksite. Also, in certain embodiments, one or more of the monitored equipment and dedicated communication hub can be configured to monitor and report data pertaining to the overall worksite conditions such as, for example, location (e.g., as determined by GPS), vibration, humidity, volume, light intensity, and radiation. Additionally or alternatively, the monitored equipment and/or the dedicated communication hub can be configured to monitor and report data pertaining to the individual workers present at the worksite, as well as details concerning the manner of using any of the monitored equipment by each of those individual workers. It will be appreciated that detection of the individual workers and associated activities can be facilitated through monitoring of the location of the smartphones of the individual workers, monitoring the location of a badge associated with each of the workers (e.g., through use of RFID), or any of a variety of other suitable methods.

It will be appreciated that each of the monitored equipment present within a worksite (e.g., ladders, scaffolds, safety harnesses) can include integrated low-powered, sensor structures and associated electronics. For example, a sensor structure can include a suitable mechanical configuration allowing for predetermined deflection under force along with one or more associated strain gauges, Hall effect sensors and/or other electronic transducers suitable to facilitate measurement of such force or deflection. It will be appreciated that one or more sensors can employ a Hall effect sensor such as of a type described in U.S. Pat. Nos. 11,486,772, 11,536,782, and 11,635,307, the entire disclosures of which are hereby incorporated by reference herein in their entireties. A sensor structure can alternatively or additionally include an accelerometer, an inclinometer, and/or any of a variety of other suitable measurement devices.

It will be appreciated that sensors and electronics integrated into equipment can be configured to have low energy requirements and/or constant or variable sampling rates, to facilitate desired monitoring and warnings but while preserving battery life. The sensors and other electronics can be configured to minimize the battery power consumption for sensing, computation, and data communication. In one embodiment, energy harvesting can be provided such as by incorporating a vibration or movement energy harvesting system into such equipment. Such systems can convert the energy from vibration, displacement and/or the rotational kinetic energy into electrical energy to recharge batteries or capacitors of sensors and other electronics installed. Piezoelectric or induction-based energy capture or conversion technologies can additionally or alternatively be employed. In other embodiments, such sensors or electronics can include replaceable batteries.

Regardless of the type and quantity of sensors on a particular piece of monitored equipment, it will be appreciated that each of them can be provided in communication with a computing unit. Some or all of the sensors can be wired to the computing unit, though in other embodiments some or all of the sensors can be wirelessly coupled with the computing unit. The computing unit can be provided with an awareness of the assembly-related status/set-up of the piece of equipment, either through programming or otherwise, to facilitate its effective discernment of operation of the piece of equipment. By monitoring feedback from the sensors, the computing unit can assess status of operation of the equipment and can then provide or facilitate provision of alerts to users and possibly others. For example, the electronics can communicate via any of a variety of suitable pathways such as Bluetooth for local communication of warnings, as well as existing and emerging cellular, satellite, LoRa or other communication modalities for communication to data aggregation and storage facilities and notification of emergency and responsible authorities. Upon occurrence of an alert, the electronics can capture and record data such as the time, date, location, operator identity, identification of the item of equipment, and the type and duration of the misuse or hazardous condition.

It will be appreciated that a computing unit can comprise one or more processors or computers and can be configured to execute firmware or other software. In one embodiment, the entirety of a computing unit can be physically attached or integrated with a piece of equipment and, in such a configuration, can be provided with cellular-enabled, Wi-Fi, satellite, LoRa or other communications capabilities for directly transmitting data remotely from the worksite, such as to emergency and responsible personnel. However, in another embodiment, a first portion of a computing unit can be physically attached or integrated with a piece of equipment (e.g., wired to each of the sensors provided on the piece of equipment, and comprising a processor, memory, Bluetooth or other near field wireless communication capability, a power supply, and alerting indicia), while a second portion of the computing unit can be provided by a dedicated communication hub and/or a worker's smartphone provided remotely from the piece of equipment but in wireless communication with the first portion of the computing unit. In this latter configuration, smartphones, already in use by virtually all construction workers, can be wirelessly coupled with the system of sensors and communication electronics on the equipment to promptly detect and issue alerts of risky conditions and worker behavior. In addition to providing alerts to a user, a smartphone can transmit data to a backend server where the data can later be reviewed by the user, supervisors, equipment manufacturers, insurance companies, and others, both on an individualized basis and in aggregation with other data.

Wireless communication technologies can be employed to transmit signals from the equipment in its usage environment, directly or through a smartphone or dedicated communication hub, to a responsible emergency response authority in case of an accident and/or to infinitely scalable repository services for anonymous, aggregated data storage for further analysis and extraction of actionable insights. For example, in one embodiment, the wireless communication can involve use of Bluetooth for communication of data between equipment-mounted sensors and electronics with a smartphone, and the smartphone can then use cellular-enabled, Wi-Fi, satellite, LoRa or other communications to facilitate transmission of that data remotely from the worksite, such as to emergency and responsible personnel. By employing a smartphone as part of worksite safety systems, apparatuses, devices, and methods, it will be appreciated that use thereof by a user can be simple and inexpensive and can thus likely be more readily adopted and used in the field. Implementation of this technology can accordingly be relatively inexpensive and need not require large investments in purchasing or learning operation of new equipment by end users. It will be appreciated, however, that in other embodiments, equipment-mounted electronics can incorporate cellular-enabled, Wi-Fi, satellite, Lora or other communications capabilities for directly transmitting data remotely from the worksite, such as to emergency and responsible personnel.

A warning, such as by a smartphone or provided directly by electronics integrated into the monitored equipment (e.g., lights, displays, audible indicators, and/or vibrators), can effectively communicate the presence of danger to the user and guide the user to produce the desired behavioral outcome. For example, the success of the warning can be influenced by a myriad of perceptual factors including the modality, intensity, and temporal structure of the signal; contextual factors including noise and potential distractors in the environment; as well as cognitive factors such as load and other constraints produced by the working task demands. The warning signal can accordingly reliably alert workers to the possibility of an impending injury, thereby reducing the likelihood of accidents across a myriad of contexts and working environments. Visual, auditory and/or tactile feedback signals can accordingly be provided. It will be appreciated that multimodal warnings (i.e., delivered via multiple perceptual channels) can be more readily detected, elicit greater compliance, elicit faster response times and fewer false responses than warnings delivered through any single modality alone. However, because multimodal warnings may demand active monitoring across several perceptual sensory channels, they may induce increased subjective workload and perhaps may produce startle responses from the user, both of which can prove overly distracting for a worker. The mode and type of warning signal(s) can be selected to achieve maximum effectiveness of reducing risk and promoting worker compliance to safe behaviors. In one embodiment, a sensor-based alarming system (i.e., alarming when sensor readings exceed a pre-defined alarm threshold, such as an over-loading condition) can be implemented in edge electronics located on the equipment and can be configured for wireless communication with a smartphone, artificial intelligence (AI) computation, alarm triggering, and powering of low-energy sensors. A smartphone app can communicate with the edge electronics and generate alarms to alert workers to potential hazards.

Figure 5A:
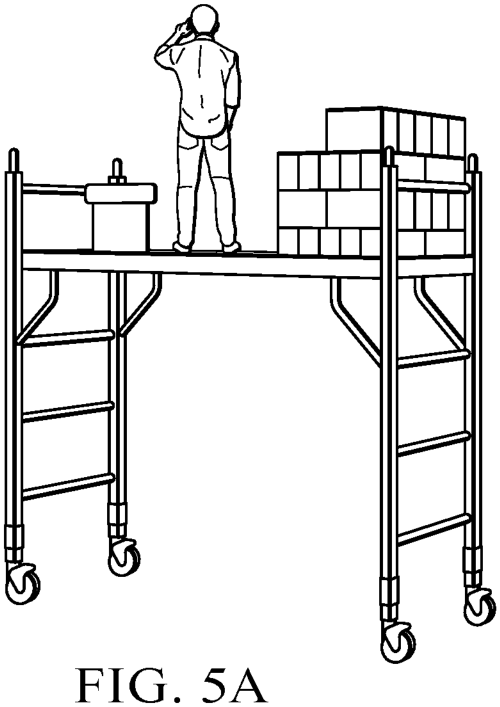
FIGS. 5A-5F illustrate several operational scenarios of the scaffold assembly of FIG. 3 which can be detectable by a monitoring system in accordance with one embodiment.
Figure 5B:
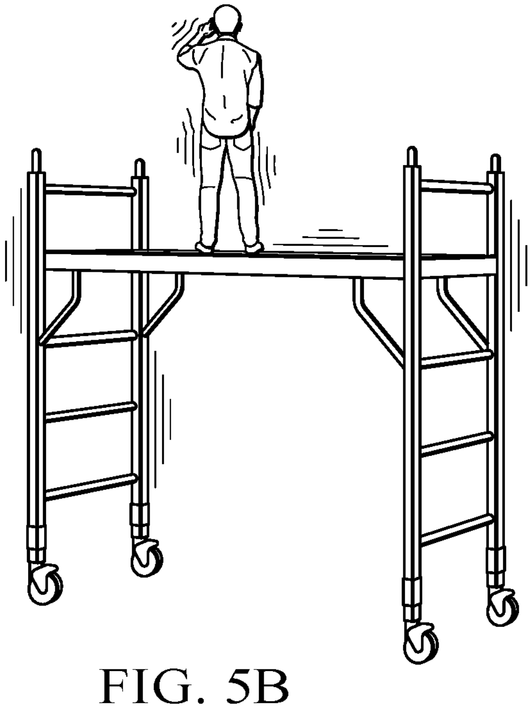
Figure 5C:
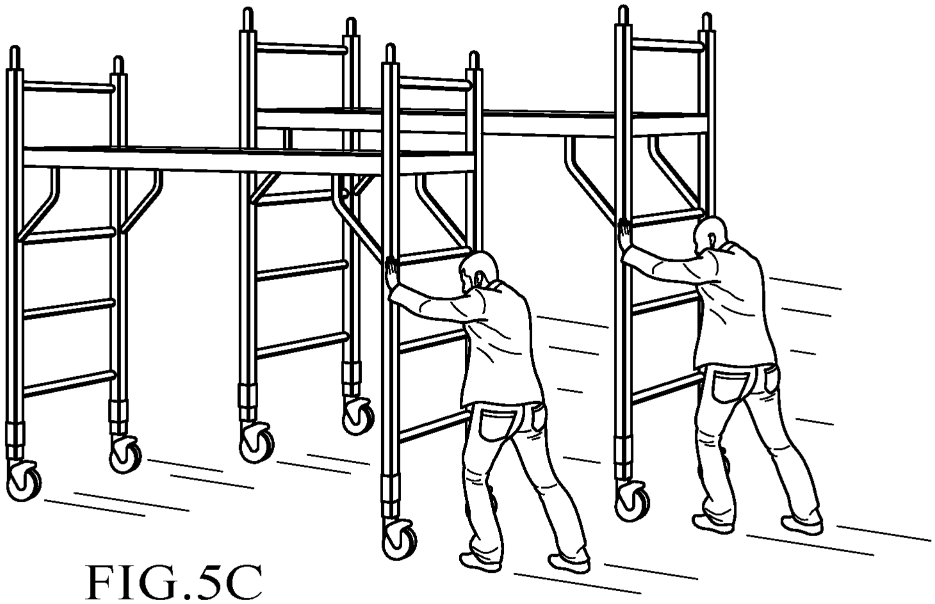
Figure 5D:
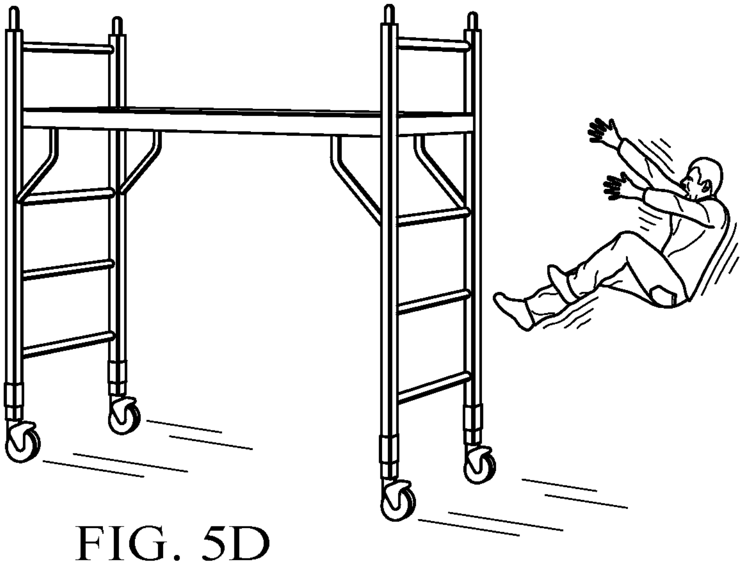
Figure 5E:
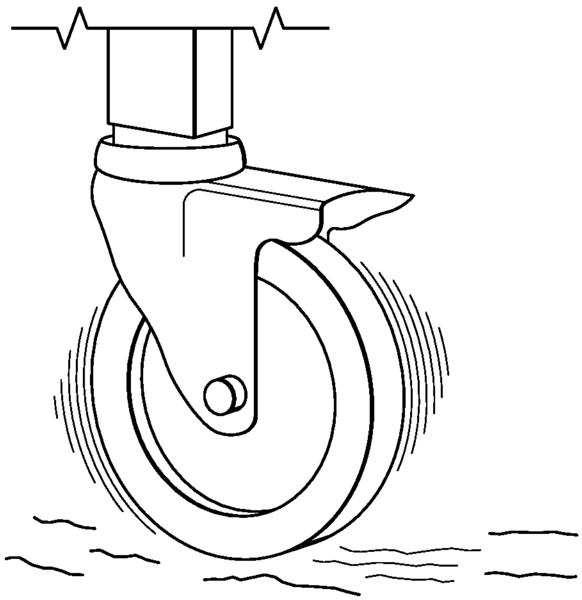
Figure 5F:
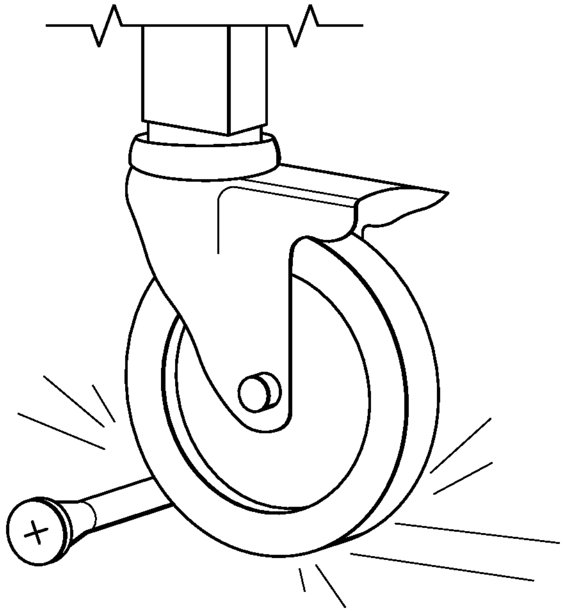

As an example, and in particular with respect to a scaffold serving as an item of monitored equipment, FIGS. 5A-5F illustrate several operational scenarios which can be detectable by a monitoring system in accordance with one embodiment. Examples of such detectable conditions can include, for example, exceeding of maximum load capability or unbalance of loading (FIG. 5A), instability (FIG. 5B), excessive movement speed or movement while occupied (FIG. 5C), falling of the operator or inappropriate climbing of side structure (FIG. 5D), irregular rolling surface (FIG. 5E), and jam/lock-up of the wheel(s) (FIG. 5F). It will be appreciated that any of a variety of additional or alternative working conditions and/or behavior can also be detected. The worksite safety systems, apparatuses, devices, and methods can accordingly have the capability to detect and differentiate among risky behaviors on scaffolds such as these and then alert workers before falls occur in ways that do not distract workers and cause greater risk.

FIG. 2 provides an example in which overall worksite conditions are monitored such as by an electronic vision system that can be integrated with, wired to or wirelessly coupled with the dedicated communication hub 114. The vision system can identify existence of hazards that can potentially interact with workers or equipment (e.g., an elevated working implement or unit of elevated work equipment) to create opportunity for injury. The vision system can also identify existence of safety incidents (e.g., falls), near misses, or instability conditions such as involving an elevated working implement. In one embodiment, the vision system can scan video at a given rate, but this rate can be modified based upon level of perceived activity. For example, video scan rate can be increased upon detection of an increased level of activity but decreased upon subsequent detection of decreased level of activity. Artificial intelligence (AI) can be employed to process video and other data and can, in one example, serve to identify both tools (e.g., an elevated working implement) and hazards, as well as to implement a classification of the hazards. Through image processing, an approximation can be made of the distance between the tools and the hazards. Based upon the approximate distance and other factors, the system (e.g., with AI) can determine the appropriateness of issuing a warning to the user and, if appropriate, effectuate issuance of the warning.

The electronic vision system can include, for example, one or more cameras, laser vision systems, sonar systems, and/or motion detectors. For example, a building can have a mix of video gateways, e.g., located in higher consequence spaces (measured by risk or activity), and non-video gateways. The electronic vision system can be configured to detect hazards or potentially unsafe working conditions such as a hole (e.g., 190) in a wall, a stairwell (e.g., 192), a hole (e.g., 194) in a floor, tools or materials (e.g., 196), and/or any of a variety of other possible trip, fall or other safety concerns on a worksite. The present systems and methods can, in one embodiment, assess a level of risk presented by various conditions on a worksite, classify such events based upon the perceived risk level, and choose whether or not to generate an alert to a worker or supervisor based upon the classified risk level. For example, in the illustrated example, the methods and systems can generate an alert upon detection of an operator 122 climbing the step ladder 120 near the hole 194 in the floor; but may not generate an alert upon detection of a less significant safety risk (e.g., a hammer lying in the middle of the floor).

Equipment at the worksite can be capable of measuring and tracking usage and misusage data for individual pieces of equipment, such as when an item of equipment is being used unsafely and by whom. It can also give a picture of the activities across the whole worksite at any given time. For example, in the arrangement of FIG. 2, the communication hub 114 can identify that on a particular date and at a particular time, an operator 122 of specific identity is climbing the step ladder 120 near the hole 194 in the floor. In one embodiment, the communication hub 114 can further identify that the scaffold 180 remains unoccupied near the hole 190 in a wall and the stairwell 192. In the more complex worksite environment of FIG. 1, it will be appreciated that the workplace safety system can be configured to monitor each of the illustrated operators relative to the illustrated items of equipment, such that the relative locations and activities of each can be understood and documented. For example, a workplace safety system can identify a level of detail, for example, that on May 1, 2023, at 12:11 pm, an unidentified non-employee user is on an extension ladder having a serial number of PL01563456, while employee having ID number 070890 is in proximity. A workplace safety system can identify the number of smart ladders or other smart equipment on site, which of such items are being used at any given time, by whom, and in what manner.

It will be appreciated that classification of the hazards can account for the perceived nature of the hazard, likelihood of interaction therewith, and likelihood of resulting injury. For example, risk may be deemed high if a wheel of a scaffold (e.g., 180) approaches stairs (e.g., 192 in FIG. 2), but low if that same wheel approaches a stack of supplies or materials (e.g., 196 in FIG. 2). Further, concerning a hole (e.g., 194) in the floor, risk level can be determined based upon size of the hole. For example, a small sized hole can be ignored as being negligible risk. A medium sized hole can be deemed low risk or high risk depending upon, for example, whether it is smaller or larger than the foot or wheel of nearly equipment. A large sized hole (e.g., 194 in FIG. 2) can be deemed high risk. An elevation shift, such as a stair or slope, can also be deemed high risk, for example. In one embodiment, a hole (e.g., 190) in a wall can be deemed low risk or high risk depending upon, for example, whether it leads to internal space or outside.

It will be appreciated that the methods and systems can become apprised of worksite conditions and can assess safety concerns though use of programming, artificial intelligence, and/or machine learning. In one embodiment, the methods and systems can continually recalibrate themselves based upon new information, with an objective to consistently and reliably present warnings upon detection of unsafe worksite conditions or that are trending unsafe, but avoid providing unnecessary warnings or false alarms. While in one embodiment such systems and methods can perform such monitoring on a continuous basis, in other embodiments such monitoring (or certain types of such monitoring) can be performed periodically such as to limit power consumption, data processing requirements, and/or frequency of warnings.

Upon detection, data can then be provided to a backend analytics platform so that near accidents can be identified, accidents can be reconstructed, and an accident prevention dashboard can be presented for use by construction managers to prevent future accidents. For example, such data can be useful to improve safety training, supervision, equipment design, and maintenance. In this way, the worksite safety systems, apparatuses, devices, and methods can help prevent injuries, deaths, and financial losses. When combined with other data streams including work schedules, weather, traffic, etc., analysis in accordance with the present disclosure can reveal or predict deteriorating conditions or behavior such as when work falls behind schedule or when fatigue is predicted based upon length of the workday or hours worked during workday(s), etc.

Collection and analysis of this data can facilitate tracking of worker behavior and identification of behavioral differences among groups of workers. Customized training tools can therefore be prepared and delivered to particular workers or groups based upon their actual detected behaviors. Such training can thus be targeted to particular workers based upon their actual demonstrated behavioral deficiencies. For example, as part of this training, workers can be shown how often they nearly fell and which of their behaviors require modification. By facilitating customized training in this way, workers can get more value from the training they attend (because it is training they have demonstrated that they actually need), while spending less time in training overall (because they needn't be forced to attend training in subjects they have actually demonstrated safety proficiency), thereby achieving significant efficiencies. In one embodiment, the training can include a gamification component to track and reward improvements in worker behavior. Families and friends can even be involved in the training experience and gamification in order to further reinforce safe behavior, since it is those families and friends who would share in the suffering of an injured worker. Involving them in preventing accidents creates an additional incentive for encouraging worker use of the technology. In one embodiment, components of the training, gamification, and involvement by others can be facilitated through use of smartphones.

In accordance with the present disclosure, worksite safety systems, apparatuses, devices, and methods can accordingly serve to provide an automated system that monitors, records and reports user actions that may produce unsafe conditions through operation of equipment at a worksite. The technology described herein can provide building and maintenance contractors and other employers a powerful new tool to prevent accidents, as well as documentation of accidents that have occurred or been avoided. More particularly, the described technology can provide information on how equipment is used and abused minute by minute, how workers behave before falls, and when accidents are narrowly missed. The gathered data can inform every aspect of equipment safety from training and supervision to designs and maintenance, and can result in improved worker safety behavior, reduced workplace injuries, and reduced insurance costs. Users can be alerted of risky behaviors in an effort to prevent accidents and inform proper usage. Risky behavior can be reported to responsible managers, as well as to emergency personnel if an accident condition is detected. In one embodiment, the worksite safety systems, apparatuses, devices, and methods disclosed herein, based upon determination of an unsafe condition involving use of the item of equipment, can facilitate disablement of another item of equipment. For example, if it is determined that a worker is excessively leaning on a ladder while operating a hammer drill, the present systems can facilitate a communication to the hammer drill resulting in disablement of the hammer drill, at least until the leaning condition is resolved.

The worksite safety systems, apparatuses, devices, and methods disclosed herein can accordingly facilitate monitoring, predicting and alerting of unsafe use, unsafe set-up and operation of equipment in the construction trades and other uses. It will be appreciated that the worksite safety systems, apparatuses, devices, and methods disclosed herein, based upon processing of information from sensors on an item of equipment, can additionally or alternatively identify the "health" of a particular item of equipment, such as whether it is broken, requires maintenance, or is in an unsafe working condition. Upon determination that an item of equipment is unhealthy or requires maintenance, the present systems and methods can inform an operator thereof and advise them against use thereof.

While use of a smartphone is described herein, it will be appreciated that any suitable networked device can be used in place of a smartphone such as, for example, a tablet, a gaming device, a headset computing device, a wearable computing device, and so forth. In one embodiment, a dedicated communications device can be provided in place of a smartphone, namely to serve as a repeater by receiving information through near field transmissions (e.g., involving Bluetooth) and transmitting that information through longer distance communications (e.g., involving cellular or satellite). While Bluetooth is discussed herein, it will be appreciated that any of a variety of suitable alternative near field or short range networking protocols can instead be used in other embodiments.

Figure 6:
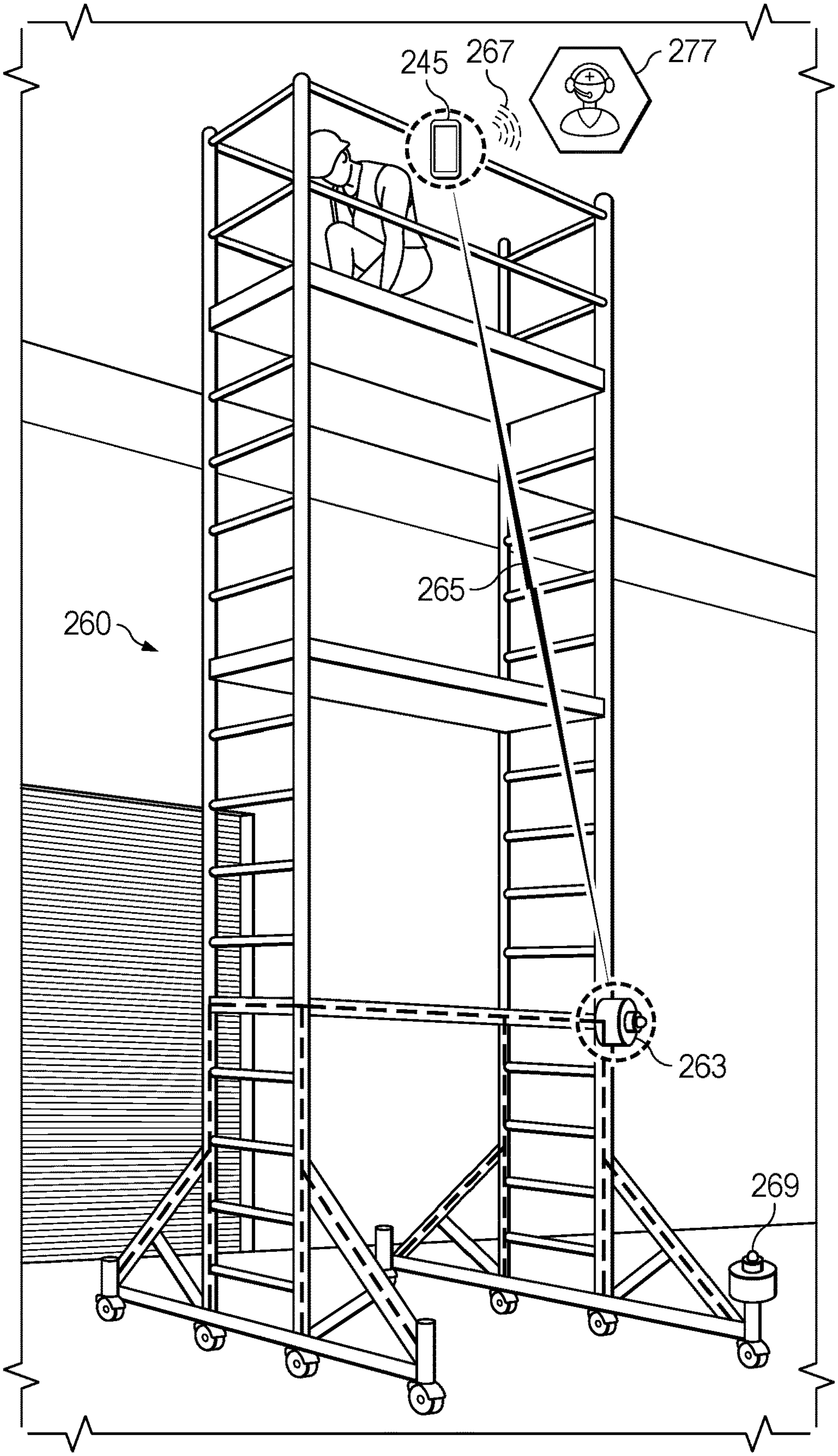
FIG. 6 is a perspective view depicting an operator on a scaffold having a monitoring system in accordance with an alternative embodiment.

FIG. 6 illustrates another example of how a scaffold 260 can assist in facilitating provision of a worksite safety system. The scaffold 260 can be provided with one or more sensors that can be configured to monitor various operational characteristics of the scaffold 260, including for example any of those discussed herein with respect to the scaffold 80 of FIG. 3 (e.g., exceeding of maximum load capability, unbalance of loading, instability, excessive movement speed, movement while occupied, falling of the operator, inappropriate climbing of side structure, irregular rolling surface, and jam/lock-up of the wheel(s)). For example, a sensor module e is shown to be provided at one of the feet of the scaffold 260. The sensor module 269 can include one or more force transducers (e.g., Hall effect type or strain gauge type), velocity sensors, accelerometers, inclinometers, or other sensing components, for example. The sensor module 269 can be wired or wirelessly coupled together with an edge gateway 263 provided on the scaffold 260. A plurality of additional sensors can also be wired together with the edge gateway 263, as represented generally by dashed lines shown on FIG. 6, though it will be appreciated that in other embodiments, wireless communication can alternatively be used to facilitate communication of the additional sensors with the edge gateway 263. In one embodiment, the sensor module 269 can be configured to harvest energy for itself and the edge gateway 263 from rolling of the scaffold 260, though it will be appreciated that power can alternatively be provided in any of a variety of other suitable ways.

Upon gathering of signals from the sensors, the edge gateway 263 can process the signals using AI or other processing to determine if an unsafe condition exists, if conditions are trending toward an unsafe condition, and/or if an alert should be generated. As a result of this processing, the edge gateway 263 can employ near field communications, such as Bluetooth and shown as 265, to communicate data, information and/or warnings to a mobile communications device such as a smartphone 245 in the possession of an operator on the scaffold 260. The smartphone 245 can provide alerts to the operator in the form of audible and/or visual notifications, and can communicate data, information and/or warnings via longer range communication 267 to a remote monitoring source such as a supervisor or emergency call center 277. It will be appreciated with reference to FIG. 6 that the present apparatuses, systems and methods can facilitate real-time dynamic monitoring of a complex scaffolding system which can continually assess the structural safety of the scaffolding based upon the current load distribution and changes to the loading.

Figure 7:
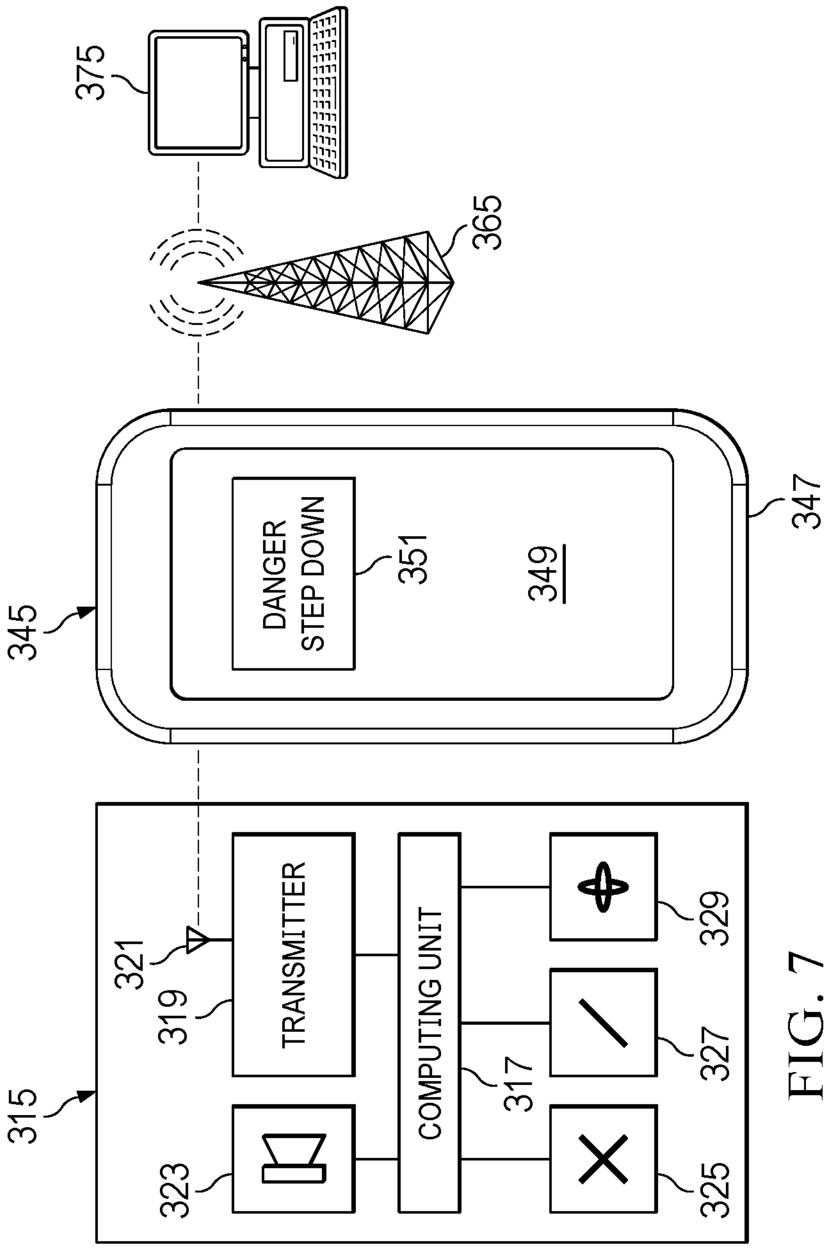
FIG. 7 is a schematic view illustrating communication among various components of a workplace safety system in accordance with one embodiment.

In one embodiment, in addition to an item of monitored equipment such as an elevated working implement (e.g., a ladder or a scaffold) and a mobile communications device, a workplace safety system and method can further include a scoring computing system. Such an arrangement will now be described with respect to FIG. 7. In particular, an item of monitored equipment 315 (e.g., a step ladder) is shown in FIG. 7 to include a plurality of sensors, such as a Hall effect sensor 325, an inclinometer 327, and an accelerometer 329 which are electrically coupled with and monitored by a computing unit 317. It will be appreciated that in other embodiments, an item of monitored equipment can include fewer or more than three sensors, or additional or alternative types of sensors. Each of the sensor(s) detects use of the item of monitored equipment by an operator, and in response thereto generates and provides signals to the computing unit 317. The signals are at least partially based on a manner by which the operator has used the item of monitored equipment. In an example in which the item of monitored equipment comprises an elevated working implement such as a step ladder, the monitored use can comprise climbing of the elevated working implement by the user.

The item of monitored equipment 315 is further shown to comprise a transmitter 319 which is electrically coupled with the computing unit 317 and an antenna 321. In one embodiment, the transmitter 319 can be configured to wirelessly transmit (e.g., via a short-range communication protocol such as Bluetooth) information associated with the use of the item of monitored equipment 315, as determined by the computing unit 317 from signals received from one or more associated sensor(s) (e.g., 325, 327, 329). This wireless transmission can convey data and/or information from the item of monitored equipment 315 to a mobile communications device in possession of the operator, such as a smartphone 345. In response to receipt of data and/or information from the item of monitored equipment 315, the mobile communications device (e.g., smartphone 345) can wirelessly transmit data over a communications network (e.g., involving tower 365) to a scoring computing system schematically represented by computer 375 in FIG. 7. In an alternative embodiment, the wireless transmission from the transmitter 319 can convey data and/or information from the item of monitored equipment 315 through an alternative indirect route or through a direct route to a scoring computing system.

The data transmitted to the scoring computing system can comprise both an identity of the operator of the item of monitored equipment 315, as well as a characteristic of operation of the item of monitored equipment 315. The identity of the operator can be recognized or determined by the computing unit 317 or other component of the item of monitored equipment 315, by the mobile communication device (e.g., smartphone 345), by some other device or system (e.g., a dedicated communication hub 114 in FIG. 2) coupled with the scoring computing system, or by the scoring computing system itself. If the identity of the operator is determined by the computing unit 317, the transmitter 319 can transmit the identity to the mobile communications device (e.g., smartphone 345) or directly to the scoring computing system. If the mobile communications device receives the identity of the operator from the item of monitored equipment 315, or itself determines the identity of the operator, the mobile communications device can transmit the identity to the scoring computing system. In one embodiment, the data transmitted to the scoring computing system can additionally or alternatively comprise signals from one or more sensor(s) (e.g., 325, 327 and/or 329) of the monitored equipment 315. The scoring computing system can accordingly be in networked communication with the mobile communications device and can be configured to receive data.

In one embodiment, the item of monitored equipment 315 can comprise an alerting device, such as speaker 323, that is electrically coupled with the computing unit 317 and configured to generate alerting indicia in response to the computing unit 317 determining that the characteristic of operation is unsafe or progressing to an unsafe condition. In another embodiment, the mobile communications device (e.g., smartphone 345) can provide alerting indicia in response to a determination by either the computing unit 317 or the mobile communications device that the characteristic of operation is unsafe or progressing toward an unsafe condition. As shown in FIG. 7, the alerting indicia provided by the smartphone 345 can be in the form of a visual warning 351 provided as a graphical user interface upon a display 349 of the smartphone 345, and/or in the form of an audible sound provided by a speaker 347 of the smartphone 345.

The characteristic of operation can, in one embodiment, be determined or have been determined based upon the signals from the sensor(s) (e.g., 325, 327, and/or 329) and can represent a manner by which the operator has used the item of monitored equipment 315. In one example, the characteristic of operation can be determined by processing accomplished by the computing unit 317 based upon signals from the sensor(s) (e.g., 325, 327, and/or 329), and then be transmitted by the transmitter 319 to the mobile communications device (e.g., smartphone 345) for subsequent transmission thereby to the scoring computing system. In another embodiment, the characteristic of operation can be determined by processing accomplished on the mobile communications device (e.g., smartphone 345), and then be transmitted to the scoring computing system by the mobile communications device (e.g., smartphone 345). In still another embodiment, the characteristic of operation of the item of monitored equipment 315 can be determined by the scoring computing system itself based upon the signals from the sensor(s), such as through processing of those signals accomplished by the scoring computing system itself.

The scoring computing system can be configured to generate a score or safety score associated with the operator based upon the characteristic of operation. The score can represent an operator's behavior for safety based upon the signals, data and/or information received by the scoring computing system. In one embodiment, the scoring computing system can receive data from each of a plurality of distinct sessions of use of an item of monitored equipment by the operator and can calculate the score for the operator based upon the data received for each of the plurality of distinct sessions. The data received by the scoring computing system can include an identification of the item of monitored equipment. The data received by the scoring computing system can include geolocation information associated with the item of monitored equipment during its use by the operator, wherein in some cases, the geolocation information can differ among at least some of the plurality of distinct sessions of use thereof. The data received by the scoring computing system can additionally or alternatively include temporal information associated with the item of monitored equipment during its use by the operator. It will thus be appreciated that the score can be based upon multiple instances of the data, with each instance of the data relating to a respective distinct session of use of the item of monitored equipment by the operator and, in some cases, with the geolocation information differing among at least some of the multiple instances.

In one embodiment, the score can relate to the operator's usage of a single item of equipment. However, in alternative embodiments, the score can relate to an operator's usage of multiple items of equipment, whether of the same type or differing types. For example, such as to facilitate this latter embodiment, the scoring computing system can consider additional data in its generation of the score. The additional data can include a second characteristic of operation, such as representing a manner by which the operator has used a second item of monitored equipment. For example, the score can provide a composite score representing an operator's use of both a step ladder and a scaffold based upon data separately received by the scoring computing system relating to each.

In one embodiment, the score can fall within a predetermined range extending between a first limit and a second limit, for example between 0 and 100. The score can demonstrate an increasingly safe level of behavior by the operator as the score more nearly approaches one of the limits. For example, an increasingly safe level of behavior by the operator can be indicated as the score more nearly approaches 100, such as may reflect "100% safe behavior." In another example, an increasingly safe level of behavior by the operator can be indicated as the score more nearly approaches 0, such as may reflect "0% accident prone." It will be appreciated that, in other embodiments, a score can fall within a different predetermined range, may not be bounded to a range, may alternatively comprise an alphanumeric representation (e.g., involving a letter grade like A, B, C, D, and F), or a non-alphanumeric symbolic representation (e.g., thumbs-up or thumbs-down).

An operator, supervisor, employer, or insurance company can view an operator's score to assess an employee's propensity for safety when using one or more items of equipment, or generally. In addition, an operator, supervisor, employer, or insurance company can recognize increases or decreases in an operator's score over time to assess an employee's propensity to learn and implement safety skills. An operator can be rewarded as a result of an increased score or penalized as a result of a decreased score. Such reward can take the form of a monetary reward, benefit, favorable recognition, opportunities to perform future desirable work, or promotions, for example. Such penalty can result in loss of bonus opportunity, loss of benefit, reprimand, loss of opportunity to perform future desirable work, demotion or termination. Likewise, an employer of an operator can be rewarded as a result of an increased score of a worker or penalized as a result of a decreased score of a worker. Such reward can take the form of a monetary reward, benefit, favorable recognition, or opportunities to perform future desirable work, for example. Such penalty can result in loss of bonus opportunity, loss of benefit, reprimand, loss of opportunity to perform future desirable work, or termination. A potential customer can review the scores of individual workers of a company (e.g., construction company), or an aggregated or averaged score thereof, in deciding whether to hire the company to complete a project. Likewise, an insurance company can review the scores of an individual worker, individual workers of a company, or an aggregated or averaged score thereof, in deciding whether to provide insurance and at what rate (e.g., with a higher rate being charged as score(s) reflect lower safety compliance). Employers, supervisors or insurance companies can implement gamification techniques in an effort to motivate workers to improve their scores.

In one embodiment, the score can comprise an individual dynamic safety score or an individual safety modification score. The score can comprise a cumulative score for the user for each type of equipment operated by the user, or as a composite taking into account multiple types of equipment operated by the user. The score can accordingly serve as a proprietary and individualized user metric, enabling the user to be characterized or rated based upon the user's determined propensity for safe use of equipment. In other words, a user's propensity for unsafe behavior and relative likelihood of workplace injury can be ascertained from the user's score. In one embodiment, the score can be calculated according to the following equation:

$$\text{Score} = \sum[\text{Setup}][\text{Use}][\text{Response}]$$

In the foregoing equation, a first factor, "Setup," can reflect the quality of pre-check activities undertaken by an operator in a particular session of use of an item of equipment, as measured or determined by the associated electronics. A second factor, "Use," can reflect the behavior of the operator in then using the item of equipment to perform a work function during that session, as measured or determined by the associated electronics. A third factor, "Response," can reflect measurable changes in the behavior of the operator in the using of the item of equipment to perform a work function during that session, as determined based upon changes relative to one or more prior sessions of use of the item of equipment or other items of equipment by the operator. The "Σ" can reflect a summation or composite of the consideration of such prior factors over a period including multiple sessions. In one embodiment, each of the three factors (i.e., Setup, Use and Response) can be individually weighted with differing weight factors to account for relative importance of the factors. For example, in one embodiment, Setup can be provided with the lowest factor, while Use and Response can have higher factors and thus be more heavily weighted to facilitate a highly dynamic nature of the score.

A user of a piece of equipment can improve his or her safety score, for example, by (a) minimizing alarms and (b) being responsive to alarms in the immediate session as well as on a cumulative, time-dependent basis. The following equation can reflect such a calculation:

$$\text{Score} = \eta(\text{Setup}) + \beta(\text{Use}) \pm \left[\gamma(\text{Response})_{t_n} + \lambda(\text{Response})_{t_\infty}\right]$$

In the foregoing equation, respective weights (i.e., $\eta$, $\beta$, $\gamma$, $\lambda$) are shown for each of the factors. The Use includes sessions corresponding with $t_n$ through $t_\infty$.

More particularly, the following series of equations can account for interaction between the Use and Response:

$$\text{Use} \pm \text{Response}$$

$$[(\text{Short Term Use}) + (\text{Long Term Use})] \pm [(\text{Short Term Response}) + (\text{Long Term Response})]$$

$$[\beta_1(U_{t_n}) + B_2(U_{t_\infty})] \pm [\gamma_1(R_{t_n}) + \gamma_2(R_{t_\infty})]$$

In the above equations, $\gamma$ accounts for corrections to alarm situations that occur within a predetermined time (e.g., 3-5 minutes) of a use violation, while n can account for an interval/window (e.g., 1-2 minutes).

A real time or near real time component of the score involves where a user is warned, or an alarm or critical alarm is initiated. The following are four weighted examples of situations in which Use and Response interact within a predetermined time period (e.g., 3 minutes):

Use warning violation(+)→Positive measured Response: Σ=0

Use warning violation(−)→No measured Response/change or progress to alarm: Σ=−2

Critical Use violation(+)→Positive measured Response: Σ=−2

Critical Use violation(−)→No measured Response/change or progress to alarm: Σ=−4

These situations can be accumulated over a period of time for a particular user. The period of time can be short such as, for example, a working shift of the user. Or, the period of time can be longer such as, for example, a week, a month, a year, or during the course of a job, employment or career. It will be appreciated that $U_\infty$ and $R_\infty$ can be trending behaviors which can be intended to reflect long-term changes in behavior of the user. Either or both of these values can include some form of gamification or training to provide another mechanism to influence score, provided it or they are not overly weighted to reverse/hide daily trends in bad behavior. For that reason, in one embodiment, $\beta_1$ and $\gamma_1$ can influence score much more than $\beta_2$ and $\gamma_2$. In one example, $\beta_1$ and $\gamma_1$ can be ten times greater than $\beta_2$ and $\gamma_2$. In another example, $\beta_1$ and $\gamma_1$ can be one hundred times greater than $\beta_2$ and $\gamma_2$ (e.g., $\beta_1=10$, $\gamma_1=10$, $\beta_2=0.1$ and $\gamma_2=0.1$). It will be appreciated that, in one embodiment, in order for a score to fully recover following a single instance of detected unsafe behavior, a disproportionately high number (e.g., ten such instances) of safe behaviors may be required, thereby reducing likelihood of a user to have been successful in intentionally manipulating his score.

$U_{t_n}$ and $\gamma_{t_n}$ can be viewed as a pair in time, where $U_{t_n}$ can be a numerical count of warning and alarms in a predefined period (e.g., an 8 hour shift period), while $\gamma_{t_n}$ can be the number of close coupled adjustments within a time window n (e.g., 1-2 minutes) that are attributed to a corrective action by the user. $\gamma$ can be a repositioning of a unit of equipment (e.g., a ladder), a user's body, or any other activity of the user that results in improvement or resolution of an alarm situation.

In another embodiment, the score can be calculated for a particular user according to the following equation:

$$ISMS = \eta\sum\begin{bmatrix}\text{Setup Score} + \text{Near Miss Score} + \\ \text{Compliance Score} + \text{Additional Factor(s)}\end{bmatrix} \pm \beta\text{Rate of Change Score}$$

In the foregoing equation, "ISMS" is an Individual Safety Modification Score, and the "Σ" can reflect capture of the number and frequency of uses of a particular piece of equipment (e.g., a ladder) by a user. The "Setup Score" can account for the frequency of setup corrections, for example. The "Near Miss Score" can account for the number of serious warnings, including possible weighting thereof. For example, when the unit of equipment comprises a step ladder, hopping of the step ladder or climbing too high on the step ladder can result in a very high Near Miss Score due to the relatively high severity of the safety offense by the user, while moderately excessive leaning can result in a low Near Miss Score due to the relatively low severity of the safety offense by the user. The "Compliance Score" can reflect a user's tendency to play by rules, namely by reflecting how often or the number of times a correction is used. One or more "Additional Factor(s)" can optionally be included in such a calculation. Examples of such "Additional Factor(s)" can include a "Maintenance Score" which can reflect whether and to what extent a user regularly performs a battery check and connectivity verification for the item of monitored equipment. The "Additional Factor(s)" can additionally or alternatively take into account to what extent a user's performance with the equipment is (1) uniform in nature across the user's uses thereof, (2) more or less safe relative to uses of the equipment by other users (e.g., at the worksite, regionally, of a particular employer, of a particular collective trade group, or nationally). In this equation, the "B Rate of Change Score" can reflect to what extent a user's behavior increases or decreases in safety, and thus can serve as a positive or negative modifier to the ISMS. It will be appreciated that any of a variety of additional or alternative factors can be considered in calculating a safety score.

Notwithstanding any of the foregoing, it will be appreciated that any or all of the communications described herein, including for example to, from or with any of the items of monitored equipment described herein, can involve cellular, Wi-Fi, satellite, LoRa, Bluetooth or any of a variety of other wireless protocols and technologies. Further, in the case of cellular, such communications can occur via a public or private network, in either instance such as a 5G network. In still another embodiment, an item of monitored equipment might not include a transmitter and/or might not be configured to wirelessly transmit information associated with the use of the item of monitored equipment, but instead can be configured to store such information or data until such time that such can be offloaded or retrieved therefrom, such as on a manual basis, during a periodic download or other physical electrical interface with the item of monitored equipment.

Any element expressed herein as a means for performing a specified function is intended to encompass any way of performing that function including, for example, a combination of elements that performs that function. Furthermore the invention, as may be defined by such means-plus-function claims, resides in the fact that the functionalities provided by the various recited means are combined and brought together in a manner as defined by appended claims. Therefore, any means that can provide such functionalities may be considered equivalents to the means shown herein.

Moreover, the processes associated with the present embodiments may be executed by programmable equipment, such as computers. Software or other sets of instructions that may be employed to cause programmable equipment to execute the processes may be stored in any storage device, such as, for example, a computer system (non-volatile) memory, an optical disk, magnetic tape, or magnetic disk. Furthermore, some of the processes may be programmed when the computer system is manufactured or via a computer-readable memory medium.

It can also be appreciated that certain process aspects described herein may be performed using instructions stored on a computer-readable memory medium or media that direct a computer or computer system to perform process steps. A computer-readable medium may include, for example, memory devices such as diskettes, compact discs of both read-only and read/write varieties, optical disk drives, and hard disk drives. A non-transitory computer-readable medium may also include memory storage that may be physical, virtual, permanent, temporary, semi-permanent and/or semi-temporary.

A "computer," "computer system," "host," "engine," or "processor" may be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein may include memory for storing certain software applications used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable memory media.

In various embodiments of the present disclosure, a single component may be replaced by multiple components, and multiple components may be replaced by a single component, to perform a given function or functions. Except where such substitution would not be operative to practice embodiments of the present disclosure, such substitution is within the scope of the present disclosure. Any of the servers described herein, for example, may be replaced by a "server farm" or other grouping of networked servers (e.g., a group of server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand, and/or providing backup contingency in the event of component failure or reduction in operability.

The examples presented herein are intended to illustrate potential and specific implementations. It can be appreciated that the examples are intended primarily for purposes of illustration for those skilled in the art. No particular aspect or aspects of the examples are necessarily intended to limit the scope of the present disclosure. For example, no particular aspect or aspects of the examples of system architectures, table layouts, or report formats described herein are necessarily intended to limit the scope of the disclosure.

In general, it will be apparent to one of ordinary skill in the art that various embodiments described herein, or components or parts thereof, may be implemented in many different embodiments of software, firmware, and/or hardware, or modules thereof. The software code or specialized control hardware used to implement some of the present embodiments is not limiting of the present disclosure. Such software may be stored on any type of suitable computer-readable medium or media such as, for example, a magnetic or optical storage medium. Thus, the operation and behavior of the embodiments are described without specific reference to the actual software code or specialized hardware components. The absence of such specific references is feasible because it is clearly understood that artisans of ordinary skill would be able to design software and control hardware to implement the embodiments of the present disclosure based on the description herein with only a reasonable effort and without undue experimentation.

The systems, apparatuses, devices, and methods can include one or more processors and one or more memory units, and in particular can be facilitated through use of any suitable processor-based device or system, such as a personal computer, laptop, server, mainframe, mobile computer, other processor-based device, or a collection (e.g. network) of multiple computers, for example. The processor can execute software instructions stored on the memory unit(s). The processor can be implemented as an integrated circuit (IC) having one or multiple cores. The memory unit(s) can include volatile and/or non-volatile memory units. Volatile memory units can include random access memory (RAM), for example. Non-volatile memory units can include read-only memory (ROM) as well as mechanical non-volatile memory systems, such as a hard disk drive, optical disk drive, or other non-volatile memory. The RAM and/or ROM memory units can be implemented as discrete memory ICs. The memory unit can store executable software and data. When the processor executes the software instructions of various modules, the processor can be caused to perform the various operations of the systems, apparatuses, devices, and methods, such as described herein.

The systems, apparatuses, devices, and methods can store and access data in a variety of databases. The data stored in the databases can be stored in a non-volatile computer memory, such as a hard disk drive, read only memory (e.g. a ROM IC), or other types of non-volatile memory. In some embodiments, one or more databases of the databases can be stored on a remote electronic computer system and can be accessed via a network. As will be appreciated, a variety of other databases or other types of memory storage structures can be utilized or otherwise associated with the systems, apparatuses, devices, and methods.

The systems, apparatuses, devices, and methods can include one or more computer servers, which can include one or more web servers, one or more application servers, and/or other types of servers. The servers can cause content to be sent between or among monitored equipment, one or more dedicated communication hubs, smartphones, and/or remote computing devices, via a network in any of a number of formats. The servers can be comprised of processors (e.g. CPUs), memory units (e.g. RAM, ROM), non-volatile storage systems (e.g. hard disk drive systems), and other elements. The servers can use one or more operating systems including, but not limited to, Solaris, Linux, Windows Server, or other server operating systems.

In some embodiments, a web server can provide a graphical web user interface through which, for example, various users can visualize data captured by the monitored equipment. The graphical web user interface can also be referred to as a graphical user interface, user portal, user interface, graphical client interface, and so forth. The web server can accept requests, such as HTTP requests, from clients and serve the client's responses, such as HTTP responses, along with optional data content, such as web pages (e.g. HTML documents) and linked objects (such as images, video, documents, data, and so forth). The application server can provide a user interface for users who do not use a web browser to view data captured by the monitored equipment. Such users can have special software installed on their computing device to allow the user to communicate with the application server via a network.

In various embodiments, the systems, apparatuses, devices, and methods described herein may be configured and/or programmed to include one or more of the above-described electronic, computer-based elements and components. In addition, these elements and components may be particularly configured to execute the various rules, algorithms, programs, processes, and method steps described herein.

The foregoing description of embodiments and examples of the disclosure has been presented for purposes of illustration and description. It is not intended to be exhaustive or to limit the disclosure to the forms described. Numerous modifications are possible in light of the above teachings. Some of those modifications have been discussed and others will be understood by those skilled in the art. The embodiments were chosen and described in order to best illustrate the principles of the disclosure and various embodiments as are suited to the particular use contemplated. The scope of the disclosure is, of course, not limited to the examples or embodiments set forth herein, but can be employed in any number of applications and equivalent devices by those of ordinary skill in the art. Rather it is hereby intended the scope of the invention be defined by the claims appended hereto. Also, for any methods claimed and/or described, regardless of whether the method is described in conjunction with a flow diagram, it should be understood that unless otherwise specified or required by context, any explicit or implicit ordering of steps performed in the execution of a method does not imply that those steps must be performed in the order presented and may be performed in a different order or in parallel.

What is claimed is:

1. A method comprising:

providing at a worksite an elevated working implement, wherein the elevated working implement comprises a sensor;

detecting, with the sensor of the elevated working implement, use of the elevated working implement by an operator;

wirelessly transmitting, via a short-range communication protocol, information associated with the use, as determined by the detecting, from the elevated working implement to a mobile communications device in possession of the operator at the worksite;

wirelessly transmitting data over a communications network, by the mobile communications device to a scoring computing system, wherein the data comprises:

an identity of the operator; and a characteristic of operation, wherein the characteristic of operation has been determined based upon the information and represents a manner by which the operator has used the elevated working implement;

generating an alert in response to determining that the characteristic of operation is unsafe; and generating a score representing the operator's behavior for safety, wherein the score is cumulative based upon multiple instances of the data received over time, with each instance of the data relating to a respective one of said alert and accounts for corrective actions made by the operator within a predetermined time following each respective one of the plurality of alerts.

2. The method of claim 1 wherein the information comprises the characteristic of operation.

3. The method of claim 2 further comprising recognizing, by the mobile communications device, the identity of the operator.

4. The method of claim 2 further comprising recognizing, by the elevated working implement, the identity of the operator.

5. The method of claim 1 wherein:

the use comprises climbing of the elevated working implement by the operator; and wherein the elevated working implement comprises a scaffold or a ladder.

6. The method of claim 1 wherein the alert comprises an audible sound.

7. The method of claim 1 wherein the generating the alert is performed by the mobile communications device.

8. The method of claim 7 wherein the determination that the characteristic of operation is unsafe is performed by the mobile communications device.

9. The method of claim 1 wherein the sensor comprises a Hall effect sensor.

10. The method of claim 1 wherein the data further comprises geolocation information associated with the elevated working implement during its use by the operator.

11. The method of claim 10 wherein the geolocation information differs among at least some of the multiple instances.

12. The method of claim 1 wherein the data further comprises temporal information associated with the elevated working implement during its use by the operator.

13. The method of claim 1 wherein the data further comprises an identification of the elevated working implement.

14. The method of claim 13 wherein:

the scoring is further based upon additional data;

the additional data comprises a second characteristic of operation; and the second characteristic of operation represents a manner by which the operator has used a second elevated working implement.

15. The method of claim 1 wherein:

the score is a safety score;

the safety score falls within a predetermined range;

the predetermined range extends between a first limit and a second limit; and the safety score demonstrates an increasingly safe level of behavior by the operator as the safety score more nearly approaches the second limit.

16. The method of claim 15 further comprising:

recognizing increase of the safety score of the operator over time;

rewarding the operator as a result of the increase of the safety score;

recognizing decrease of the safety score of the operator over time; and penalizing the operator as a result of the decrease of the safety score.

17. The method of claim 15 further comprising:

recognizing increase of the safety score of the operator over time;

rewarding an employer of the operator as a result of the increase of the safety score;

recognizing decrease of the safety score of the operator over time; and penalizing an employer of the operator as a result of the decrease of the safety score.

18. The method of claim 1 wherein the score is a composite of a first factor, a second factor, and a third factor that are each accumulated over a plurality of respective use sessions, wherein:

the first factor is indicative of pre-check activities of the operator;

the second factor is indicative of behavior of the operator when supported upon the elevated working implement; and the third factor is indicative of changes in behavior of the operator during a current use session of the plurality of use sessions relative to at least one prior use session of the plurality of use sessions.

19. A workplace safety system comprising:

an elevated working implement comprising a sensor configured to generate signals responsive to use of the elevated working implement;

a transmitter; and a computing unit electrically coupled with each of the sensor and the transmitter; and a scoring computing system in networked communication with the elevated working implement and configured to receive data, wherein the data comprises:

an identity of an operator of the elevated working implement; and information concerning a manner by which the operator has used the elevated working implement, wherein the information is at least partially based upon the signals;

wherein the scoring computing system is configured to:

determine a characteristic of operation of the elevated working implement based upon the information;

generate a plurality of alerts in response to determining that the characteristic of operation is unsafe; and based upon the characteristic of operation, generate a safety score associated with the operator, wherein the safety score is at least partially based on corrective actions made by the operator each within a predetermined time following an associated respective one of the plurality of alerts.

20. A workplace safety system comprising:

an elevated working implement comprising:

a sensor structure comprising at least one measurement device configured to generate signals based upon the use of the elevated working implement by an operator;

an edge gateway in communication with the sensor structure and configured to receive the signals generated by the sensor structure;

a scoring computing system in networked communication with the edge gateway via a communication network, wherein the scoring computing system is configured to receive data from the edge gateway, wherein the data comprises:

an identity of an operator of the elevated working implement; and information concerning a manner by which the operator has used the elevated working implement, wherein the information is at least partially based upon the signals generated by the sensor structure;

wherein the scoring computing system is configured to:

determine characteristics of operation of the elevated working implement over a period of time based upon the information;

generate a plurality of alerts in response to determining that the characteristic of operation is unsafe; and based upon the characteristics of operation over the period of time, generate a safety score associated with the operator, wherein the safety score falls within a predetermined range extending between a first limit and a second limit and is at least partially based on corrective actions made by the operator in response to the plurality of alerts.

* * * * *